United States Patent
West et al.

(10) Patent No.: US 9,291,369 B2
(45) Date of Patent: Mar. 22, 2016

(54) SKIRT FOR PHOTOVOLTAIC ARRAYS

(75) Inventors: John Raymond West, San Rafael, CA (US); Tyrus Hawkes Hudson, San Rafael, CA (US); Emil Johansen, San Rafael, CA (US); Ian Capsuto, San Rafael, CA (US); Chad Medcroft, San Rafael, CA (US); Brian Atchley, San Rafael, CA (US); Nate Coleman, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 33 days.

(21) Appl. No.: 13/316,450

(22) Filed: Dec. 9, 2011

(65) Prior Publication Data

US 2012/0301661 A1 Nov. 29, 2012

Related U.S. Application Data

(60) Provisional application No. 61/421,626, filed on Dec. 9, 2010, provisional application No. 61/421,629, filed on Dec. 9, 2010.

(51) Int. Cl.
*E04D 13/18* (2014.01)
*F24J 2/46* (2006.01)
(Continued)

(52) U.S. Cl.
CPC ............... *F24J 2/4609* (2013.01); *F24J 2/465* (2013.01); *F24J 2/526* (2013.01); *F24J 2/5211* (2013.01);
(Continued)

(58) Field of Classification Search
CPC ........... F24J 2/045; F24J 2/465; F24J 2/4609; F24J 2/526; F24J 2/5245; F24J 2/5211; F24J 2/5254; F24J 2002/4665; F24J 2002/5226; F24J 2002/5294; H02S 20/00; H02S 20/23; H02S 30/10; Y02B 10/12; Y02B 10/20; Y02E 10/47; Y02E 10/50; Y10T 428/24008

USPC .......... 52/173.3; 126/621, 622, 623; 136/251, 136/259; 248/237
See application file for complete search history.

(56) References Cited

U.S. PATENT DOCUMENTS 3,630,253 A 12/1971 Sherman
4,047,516 A 9/1977 Bruel
(Continued)

FOREIGN PATENT DOCUMENTS

DE 3111969 10/1982
DE 44 44 439 A1 4/1995
(Continued)

OTHER PUBLICATIONS

Solarex VLX PV Module, circa 1993.
(Continued)

*Primary Examiner* — Charles A Fox
*Assistant Examiner* — James Buckle, Jr.
(74) *Attorney, Agent, or Firm* — Kilpatrick Townsend & Stockton LLP

(57) ABSTRACT

A skirt for photovoltaic arrays provides a screen portion, a groove portion, and a separate coupling adapted to couple the skirt to the skirt of an adjacent photovoltaic array and to a photovoltaic module. Another embodiment provides a screen portion comprising an angled louver and is adapted to partially obscure an area substantially beneath a PV module in a PV array. A further embodiment provides an edge blocking skirt for a PV array comprising a screen portion adapted for mounting a bottom of the screen portion substantially close to a roof.

7 Claims, 29 Drawing Sheets

(51) Int. Cl.
  *F24J 2/52* (2006.01)
  *H01L 31/042* (2014.01)
  *H02S 30/10* (2014.01)
  *H02S 20/23* (2014.01)
  *F24J 2/04* (2006.01)

(52) U.S. Cl.
  CPC .............. *F24J 2/5245* (2013.01); *F24J 2/5254* (2013.01); *H02S 20/00* (2013.01); *H02S 20/23* (2014.12); *H02S 30/10* (2014.12); *F24J 2/045* (2013.01); *F24J 2002/4665* (2013.01); *F24J 2002/5226* (2013.01); *F24J 2002/5294* (2013.01); *Y02B 10/12* (2013.01); *Y02B 10/20* (2013.01); *Y02E 10/47* (2013.01); *Y02E 10/50* (2013.01); *Y10T 428/24008* (2015.01)

(56) References Cited

U.S. PATENT DOCUMENTS

| | | |
|---|---|---|
| 4,112,922 A | 9/1978 | Skinner |
| 4,146,785 A | 3/1979 | Neale |
| 4,154,223 A | 5/1979 | Lof |
| 4,155,346 A | 5/1979 | Aresty |
| 4,215,677 A | 8/1980 | Erickson |
| 4,217,825 A | 8/1980 | Bruckner |
| 4,219,011 A | 8/1980 | Knoos |
| 4,271,825 A | 6/1981 | Schwob et al. |
| 4,308,858 A | 1/1982 | Skillman |
| 4,310,182 A | 1/1982 | Vandenbossche |
| 4,312,325 A | 1/1982 | Voges |
| 4,353,356 A | 10/1982 | Vandenbossche |
| 4,371,139 A | 2/1983 | Clark |
| 4,429,872 A | 2/1984 | Capachi |
| 4,505,261 A | 3/1985 | Hunter |
| 4,570,408 A | 2/1986 | Frascaroli |
| 4,680,905 A | 7/1987 | Rockar |
| 4,691,818 A | 9/1987 | Weber |
| 4,718,185 A | 1/1988 | Conlin |
| 4,738,247 A | 4/1988 | Moore |
| 4,966,631 A | 10/1990 | Matlin |
| 5,046,791 A | 9/1991 | Kooiman |
| 5,127,762 A | 7/1992 | Havlovitz |
| 5,134,827 A | 8/1992 | Hartman |
| 5,143,556 A | 9/1992 | Matlin |
| 5,144,780 A | 9/1992 | Gieling |
| 5,164,019 A | 11/1992 | Sinton |
| 5,164,020 A | 11/1992 | Wagner |
| 5,203,135 A | 4/1993 | Bastian |
| 5,205,694 A | 4/1993 | Nagoshi et al. |
| 5,232,518 A | 8/1993 | Nath |
| 5,316,592 A | 5/1994 | Dinwoodie |
| 5,333,602 A | 8/1994 | Huang |
| 5,338,369 A | 8/1994 | Rawlings |
| 5,460,660 A | 10/1995 | Albright et al. |
| 5,497,587 A | 3/1996 | Hirai |
| 5,505,788 A | 4/1996 | Dinwoodie |
| D374,169 S | 10/1996 | Kopish |
| 5,571,338 A | 11/1996 | Kadonome et al. |
| 5,596,981 A | 1/1997 | Soucy |
| 5,628,580 A | 5/1997 | Rinderer |
| D387,655 S | 12/1997 | Kopish |
| 5,706,617 A | 1/1998 | Hirai |
| 5,746,029 A | 5/1998 | Ullman |
| 5,746,839 A | 5/1998 | Dinwoodie |
| 5,787,653 A | 8/1998 | Sakai |
| 5,960,790 A | 10/1999 | Rich |
| 6,000,393 A | 12/1999 | Moore |
| 6,061,978 A | 5/2000 | Dinwoodie |
| 6,093,884 A | 7/2000 | Toyomura |
| 6,105,317 A | 8/2000 | Tomiuchi et al. |
| 6,111,189 A | 8/2000 | Garvison |
| 6,148,570 A | 11/2000 | Dinwoodie |
| 6,201,180 B1 | 3/2001 | Meyer |
| 6,207,889 B1 | 3/2001 | Toyomura |
| 6,269,596 B1 | 8/2001 | Ohtsuka |
| 6,274,402 B1 | 8/2001 | Verlindon |
| 6,295,818 B1 | 10/2001 | Ansley |
| 6,313,395 B1 | 11/2001 | Crane |
| 6,337,283 B1 | 1/2002 | Verlindon |
| 6,360,491 B1 | 3/2002 | Ullman |
| 6,370,828 B1 | 4/2002 | Genschorek |
| 6,387,726 B1 | 5/2002 | Verlindon |
| 6,423,568 B1 | 7/2002 | Verlindon |
| 6,465,724 B1 | 10/2002 | Garvison et al. |
| 6,495,750 B1 | 12/2002 | Dinwoodie |
| 6,501,013 B1 | 12/2002 | Dinwoodie |
| 6,523,320 B2 | 2/2003 | Stoof |
| 6,534,702 B1 | 3/2003 | Makita |
| 6,534,703 B2 | 3/2003 | Dinwoodie |
| 6,568,873 B1 | 5/2003 | Peterson |
| 6,570,084 B2 | 5/2003 | Dinwoodie |
| 6,586,668 B2 | 7/2003 | Shugar |
| 6,634,077 B2 | 10/2003 | Layfield |
| 6,670,541 B2 | 12/2003 | Nagao |
| 6,672,018 B2 | 1/2004 | Shingleton |
| 6,675,545 B2 | 1/2004 | Chen |
| 6,675,580 B2 | 1/2004 | Ansley |
| 6,676,326 B2 | 1/2004 | Wu |
| 6,722,357 B2 | 4/2004 | Shingleton |
| 6,761,008 B2 | 7/2004 | Chen et al. |
| 6,784,360 B2 | 8/2004 | Nakajima |
| 6,809,251 B2 | 10/2004 | Dinwoodie |
| 6,809,253 B2 | 10/2004 | Dinwoodie |
| 6,935,623 B2 | 8/2005 | Cook |
| D510,315 S | 10/2005 | Shugar et al. |
| D511,576 S | 11/2005 | Shingleton |
| 6,959,517 B2 | 11/2005 | Poddany et al. |
| RE38,988 E | 2/2006 | Dinwoodie |
| 6,993,917 B2 | 2/2006 | Unger |
| 7,043,884 B2 | 5/2006 | Moreno |
| 7,260,918 B2 | 8/2007 | Liebendorfer |
| 7,297,867 B2 | 11/2007 | Nomura |
| 7,328,534 B2 | 2/2008 | Dinwoodie |
| 7,339,110 B1 | 3/2008 | Mulligan |
| D565,505 S | 4/2008 | Shugar |
| 7,406,800 B2 | 8/2008 | Cinnamon |
| 7,435,134 B2 | 10/2008 | Lenox |
| 7,592,537 B1 | 9/2009 | West |
| 7,774,998 B2 | 8/2010 | Aschenbrenner |
| 7,797,889 B2 * | 9/2010 | McClintock et al. ........ 52/173.3 |
| 7,806,377 B2 | 10/2010 | Strizki |
| 7,832,157 B2 | 11/2010 | Cinnamon |
| 7,866,098 B2 | 1/2011 | Cinnamon |
| 7,866,099 B2 * | 1/2011 | Komamine et al. .......... 52/173.3 |
| 7,915,519 B2 | 3/2011 | Kobayashi |
| 7,956,281 B2 | 6/2011 | O'Brien et al. |
| 7,987,641 B2 | 8/2011 | Cinnamon |
| 8,039,733 B2 | 10/2011 | Kobayashi |
| 8,109,048 B2 | 2/2012 | West |
| 8,813,460 B2 * | 8/2014 | Cinnamon ............. F24J 2/5211 136/244 |
| 2002/0078991 A1 | 6/2002 | Nagao et al. |
| 2002/0112435 A1 | 8/2002 | Hartman |
| 2003/0010374 A1 | 1/2003 | Dinwoodie |
| 2003/0015636 A1 | 1/2003 | Liebendorfer |
| 2003/0015637 A1 | 1/2003 | Liebendorfer |
| 2003/0201009 A1 | 10/2003 | Nakajima |
| 2004/0063265 A1 | 4/2004 | Noble |
| 2004/0163338 A1 | 8/2004 | Liebendorfer |
| 2004/0179892 A1 | 9/2004 | Du Preez |
| 2005/0115176 A1 | 6/2005 | Russell |
| 2005/0126621 A1 | 6/2005 | Dinwoodie et al. |
| 2005/0199278 A1 | 9/2005 | Aschenbrenner |
| 2005/0257453 A1 | 11/2005 | Cinnamon et al. |
| 2006/0042680 A1 | 3/2006 | Korman et al. |
| 2006/0118163 A1 | 6/2006 | Plaisted |
| 2007/0074755 A1 | 4/2007 | Eberspacher et al. |
| 2007/0102036 A1 | 5/2007 | Cinnamon |
| 2007/0131273 A1 | 6/2007 | Kobayashi |
| 2007/0157963 A1 | 7/2007 | Metten et al. |
| 2007/0199561 A1 | 8/2007 | Soucy |
| 2008/0000173 A1 | 1/2008 | Lenox et al. |
| 2008/0302407 A1 | 12/2008 | Kobayashi |

(56) References Cited

U.S. PATENT DOCUMENTS

| | | | |
|---|---|---|---|
| 2009/0025314 A1* | 1/2009 | Komamine et al. ........... 52/173.3 | |
| 2009/0078299 A1* | 3/2009 | Cinnamon ............. F24J 2/5211 | |
| | | | 136/244 |
| 2009/0095280 A1 | 4/2009 | Buller et al. | |
| 2009/0217964 A1 | 9/2009 | Gilmore et al. | |
| 2009/0320906 A1 | 12/2009 | Botkin et al. | |
| 2010/0043781 A1* | 2/2010 | Jones ..................... F24J 2/5237 | |
| | | | 126/704 |
| 2010/0147362 A1 | 6/2010 | King et al. | |
| 2010/0154199 A1 | 6/2010 | Kobayashi | |
| 2010/0155547 A1 | 6/2010 | Kobayashi | |
| 2010/0179678 A1 | 7/2010 | Dinwoodie et al. | |
| 2010/0206297 A1 | 8/2010 | Wilkinson | |
| 2010/0218798 A1 | 9/2010 | Cinnamon | |
| 2010/0243023 A1* | 9/2010 | Patton ..................... F24J 2/4607 | |
| | | | 136/244 |
| 2011/0070765 A1 | 3/2011 | Kobayashi | |
| 2011/0198304 A1 | 8/2011 | Wallgren | |
| 2011/0214368 A1* | 9/2011 | Haddock et al. ............. 52/173.3 | |
| 2011/0220180 A1 | 9/2011 | Cinnamon | |
| 2011/0232715 A1 | 9/2011 | Lenox et al. | |
| 2012/0234378 A1* | 9/2012 | West ...................... F24J 2/5211 | |
| | | | 136/251 |
| 2014/0130847 A1* | 5/2014 | West ...................... F24J 2/5211 | |
| | | | 136/251 |

FOREIGN PATENT DOCUMENTS

| | | |
|---|---|---|
| DE | 2970348 | 11/1997 |
| DE | 102005002828 | 8/2006 |
| GB | 2391704 | 2/2004 |
| JP | 47-023570 | 7/1971 |
| JP | 47-057885 | 5/1972 |
| JP | 57-087561 | 1/1982 |
| JP | 57-077856 | 5/1982 |
| JP | 58-133945 | 9/1983 |
| JP | 59-191748 | 12/1984 |
| JP | 02-42449 | 3/1990 |
| JP | 04-052367 | 2/1992 |
| JP | 06-41156 | 5/1994 |
| JP | 07-202242 | 8/1995 |
| JP | 08-296311 | 11/1996 |
| JP | 10-176403 | 6/1998 |
| JP | 10-266499 | 10/1998 |
| JP | 10-317619 | 12/1998 |
| JP | 10-317621 | 12/1998 |
| JP | 11-002004 | 1/1999 |
| JP | 11-002011 | 1/1999 |
| JP | 11-006262 | 1/1999 |
| JP | 11-040835 | 2/1999 |
| JP | 11-222991 | 8/1999 |
| JP | 2000-147262 | 5/2000 |
| JP | 2000-150947 | 5/2000 |
| JP | 2000345664 | 12/2000 |
| JP | 2001-148493 | 5/2001 |
| JP | 2001-210853 | 8/2001 |
| JP | 2001-291890 | 10/2001 |
| JP | 2002-141541 | 5/2002 |
| JP | 2002-294957 | 10/2002 |
| JP | 2003-227207 | 8/2003 |
| JP | 10-159284 | 6/2008 |
| WO | WO2005116359 | 12/2005 |
| WO | WO 2007103882 | 9/2007 |
| WO | WO2010/074701 | 7/2010 |

OTHER PUBLICATIONS

Solyndra 200 Series datasheet, released Apr. 1, 2011.
Unirac Technical Bulletin 103, May 2002.
Unirac Installation Manual 210, 2003.
PCT International Search Report for Application No. PCT/US2009/060879, Dec. 3, 2009.
US 5,819,447, 10/1998, Yamawaki (withdrawn)

* cited by examiner

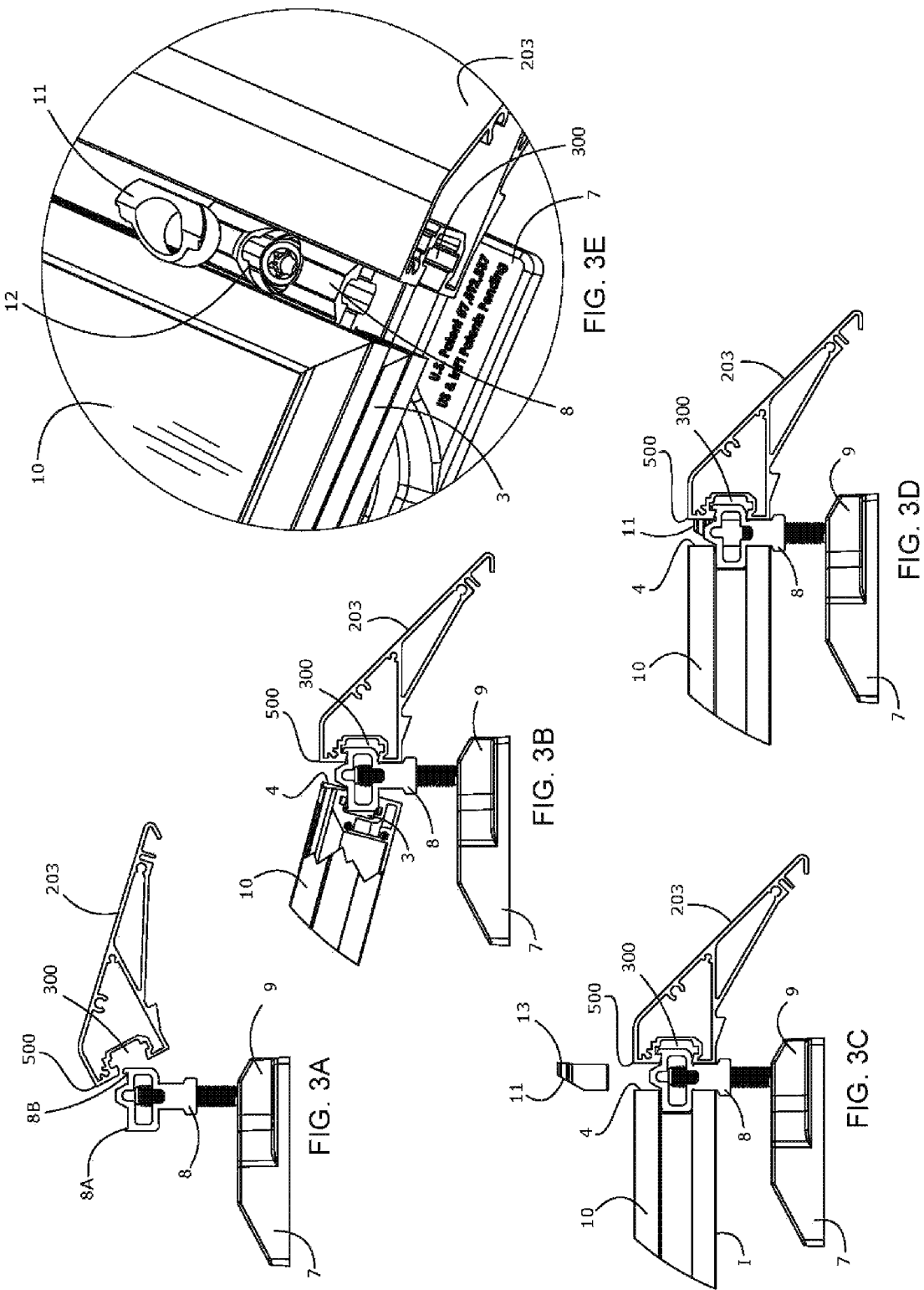

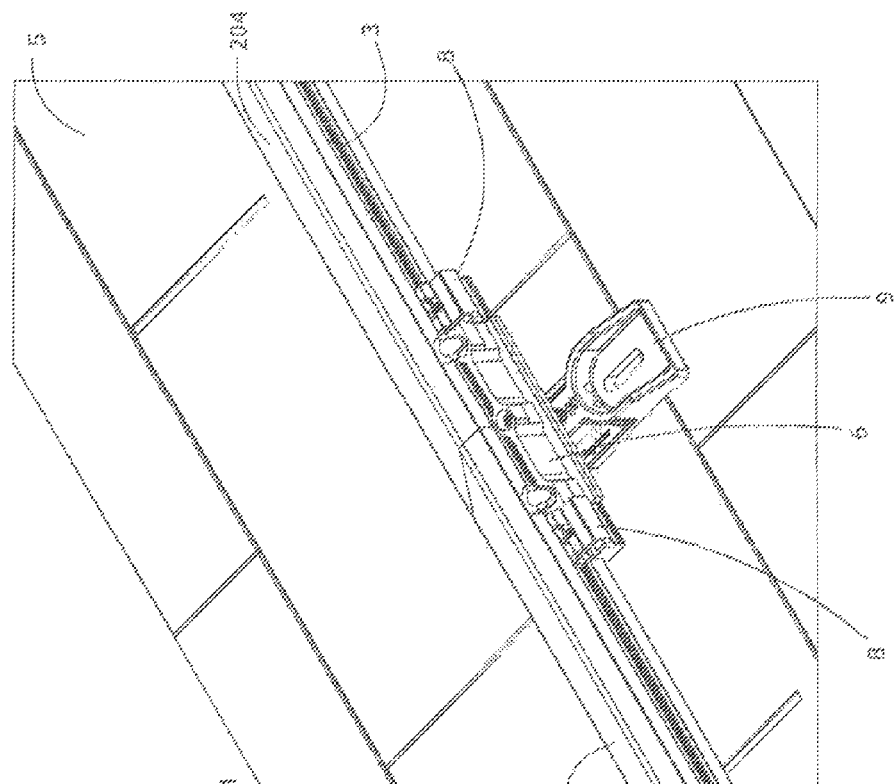
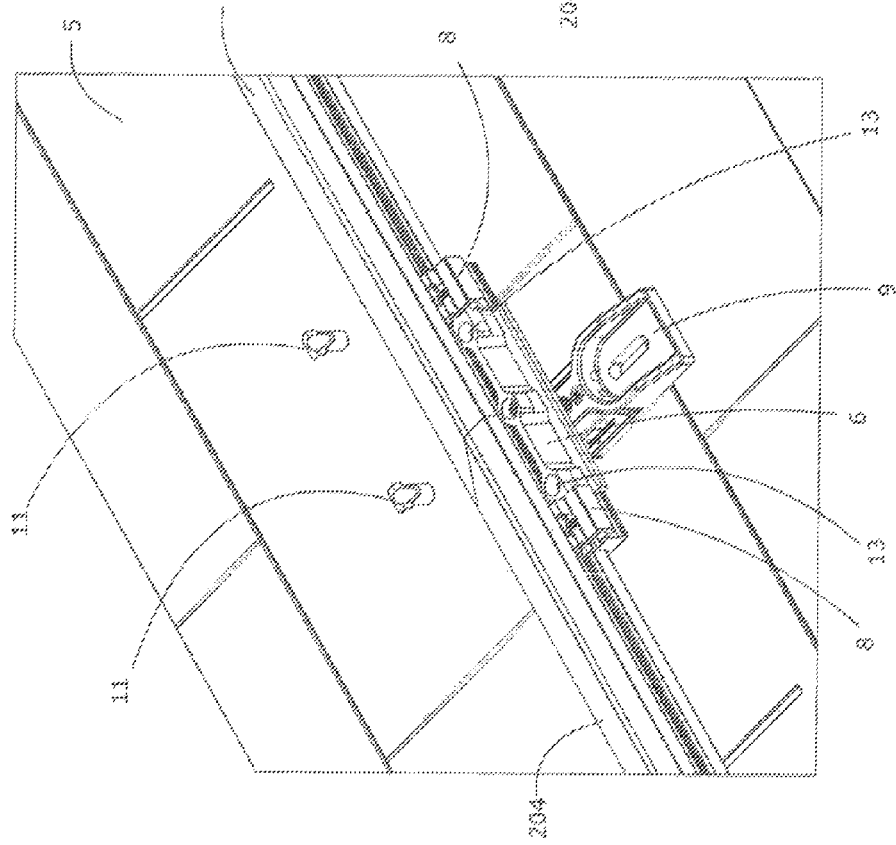

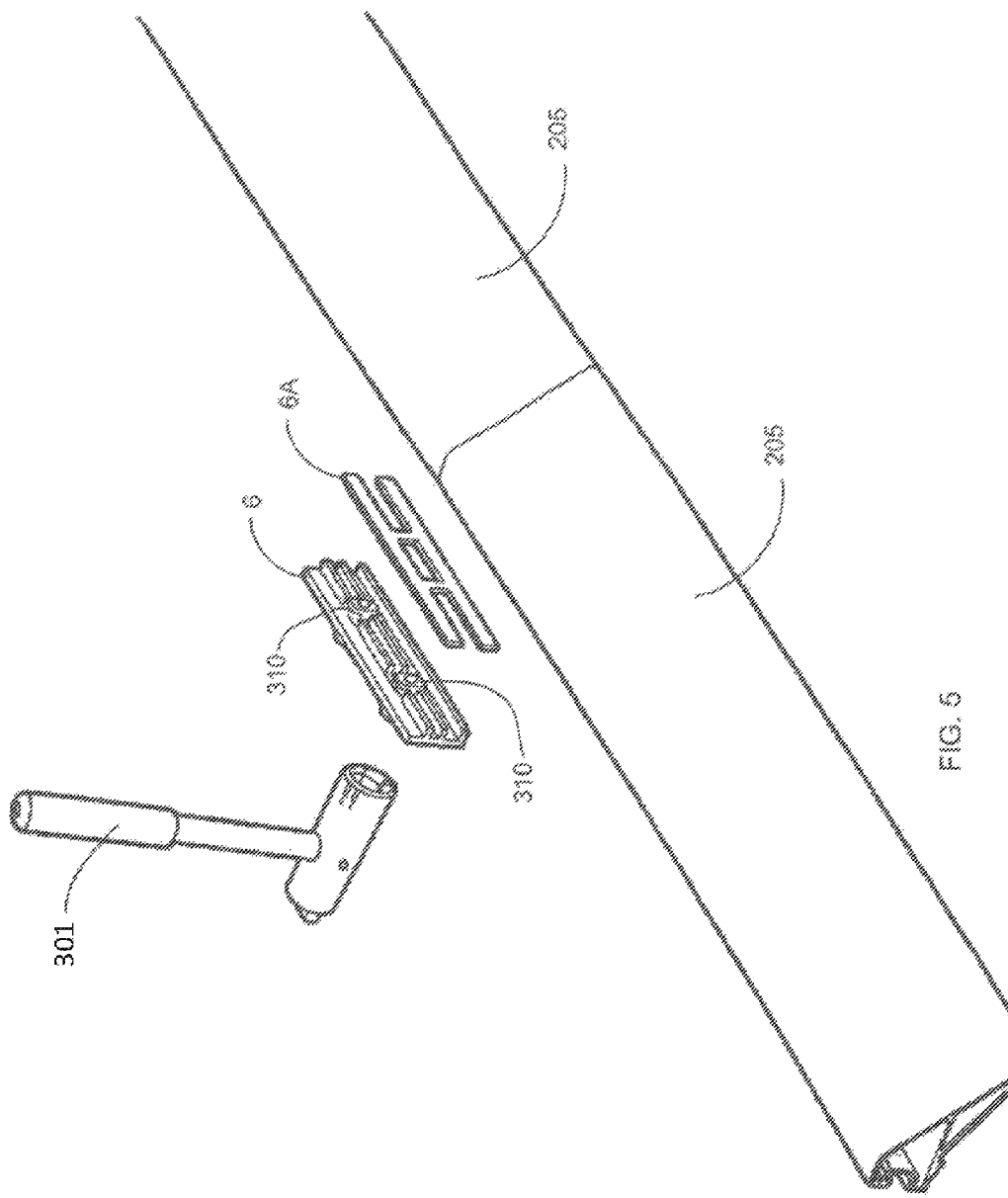

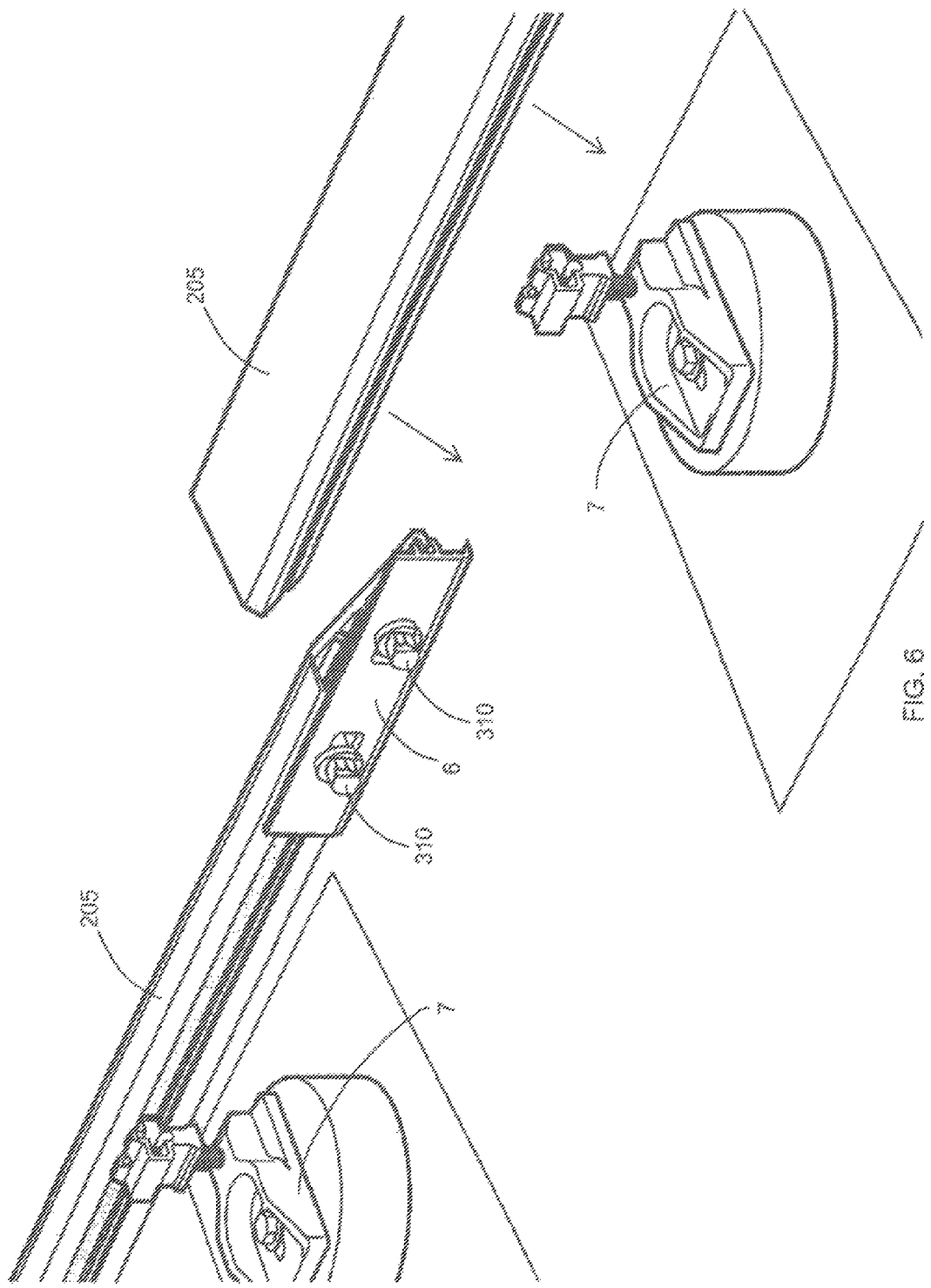

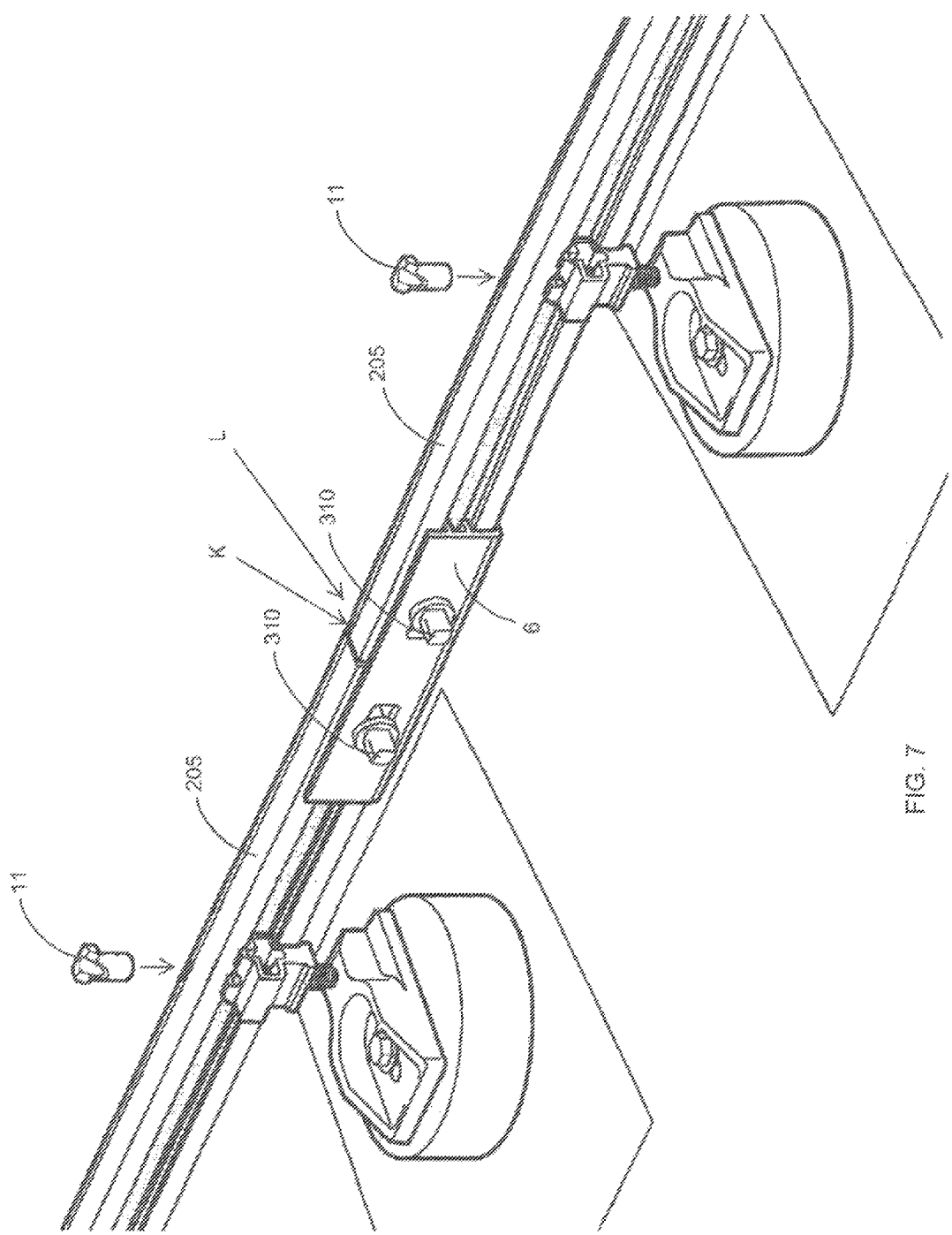

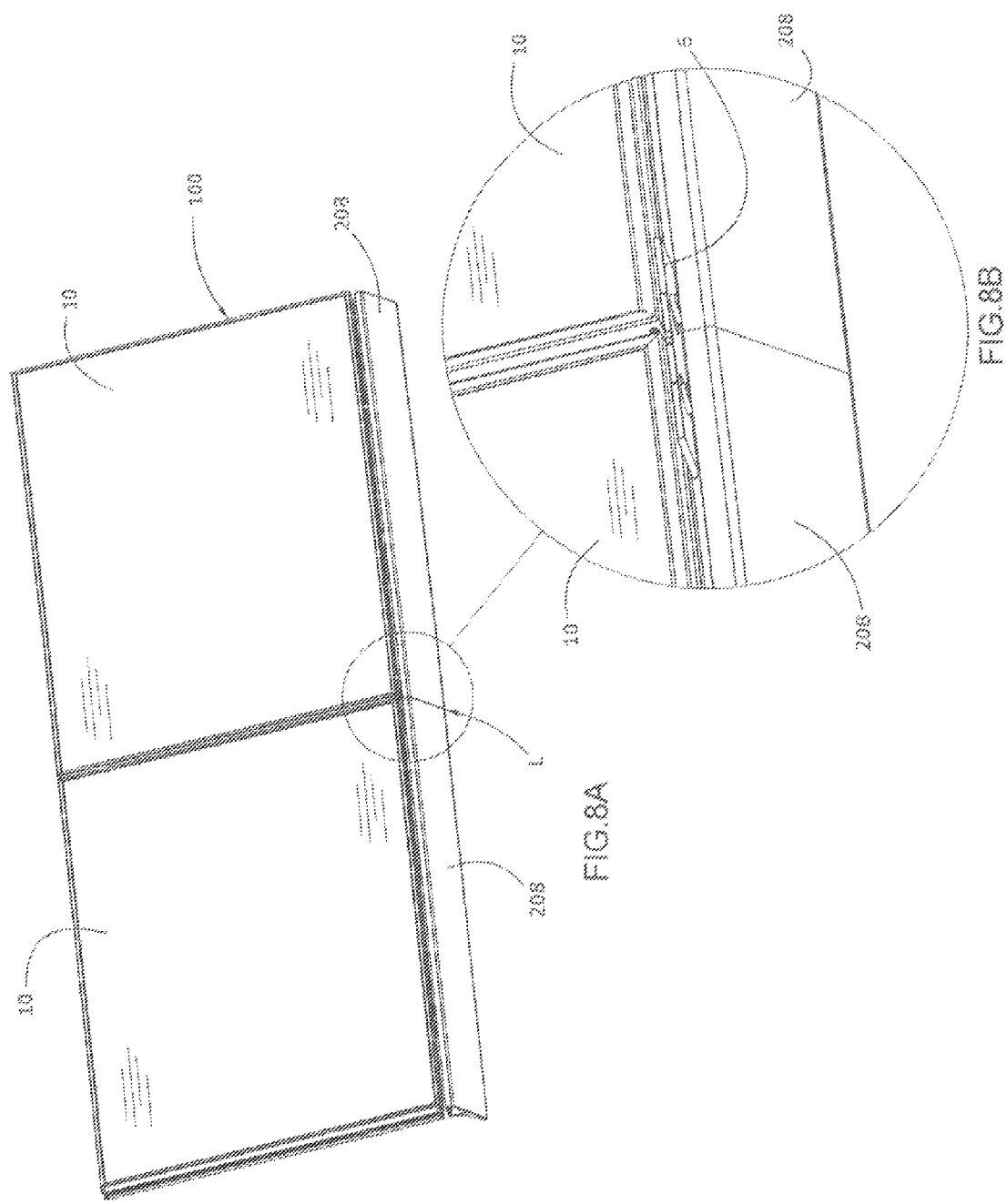

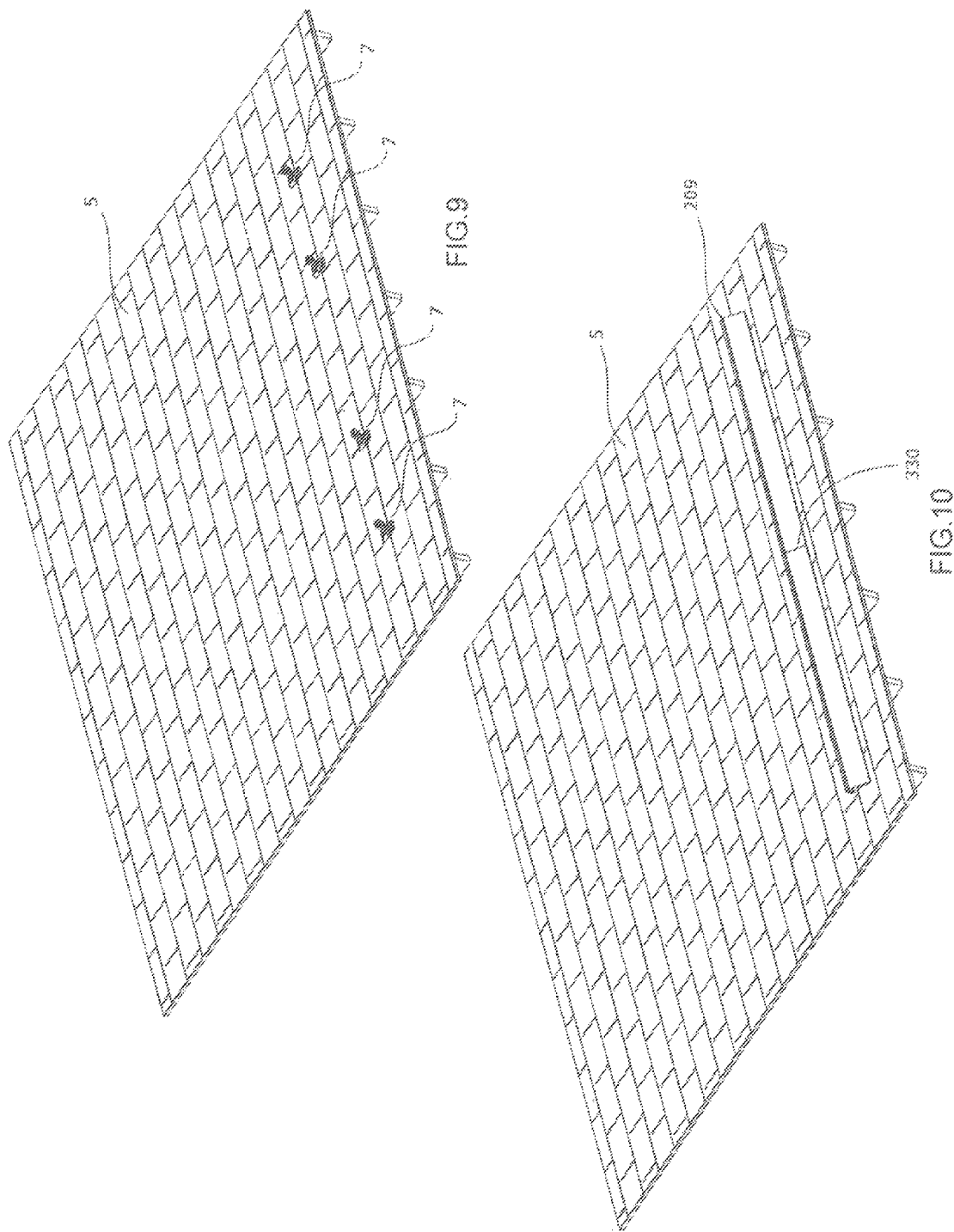

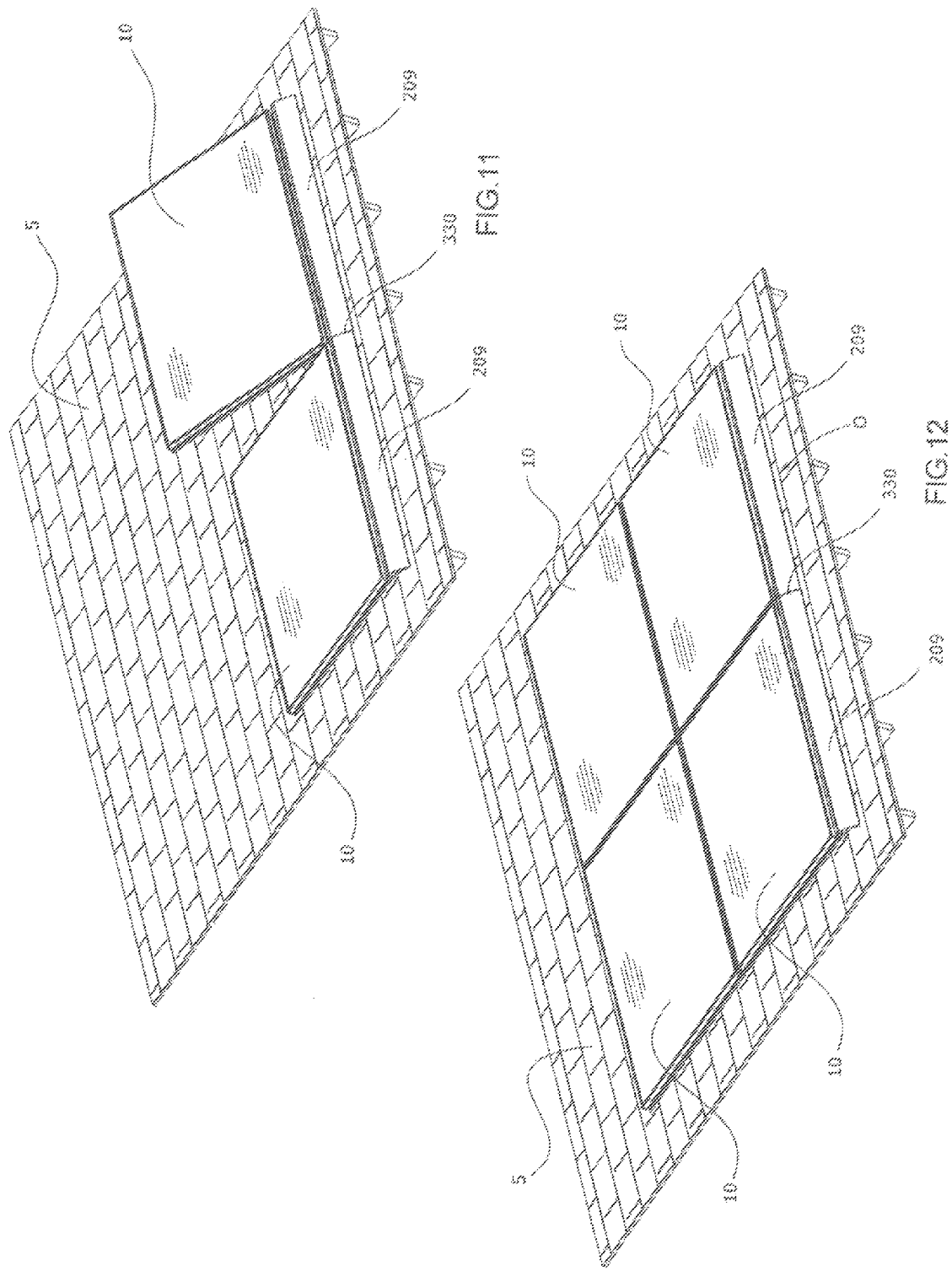

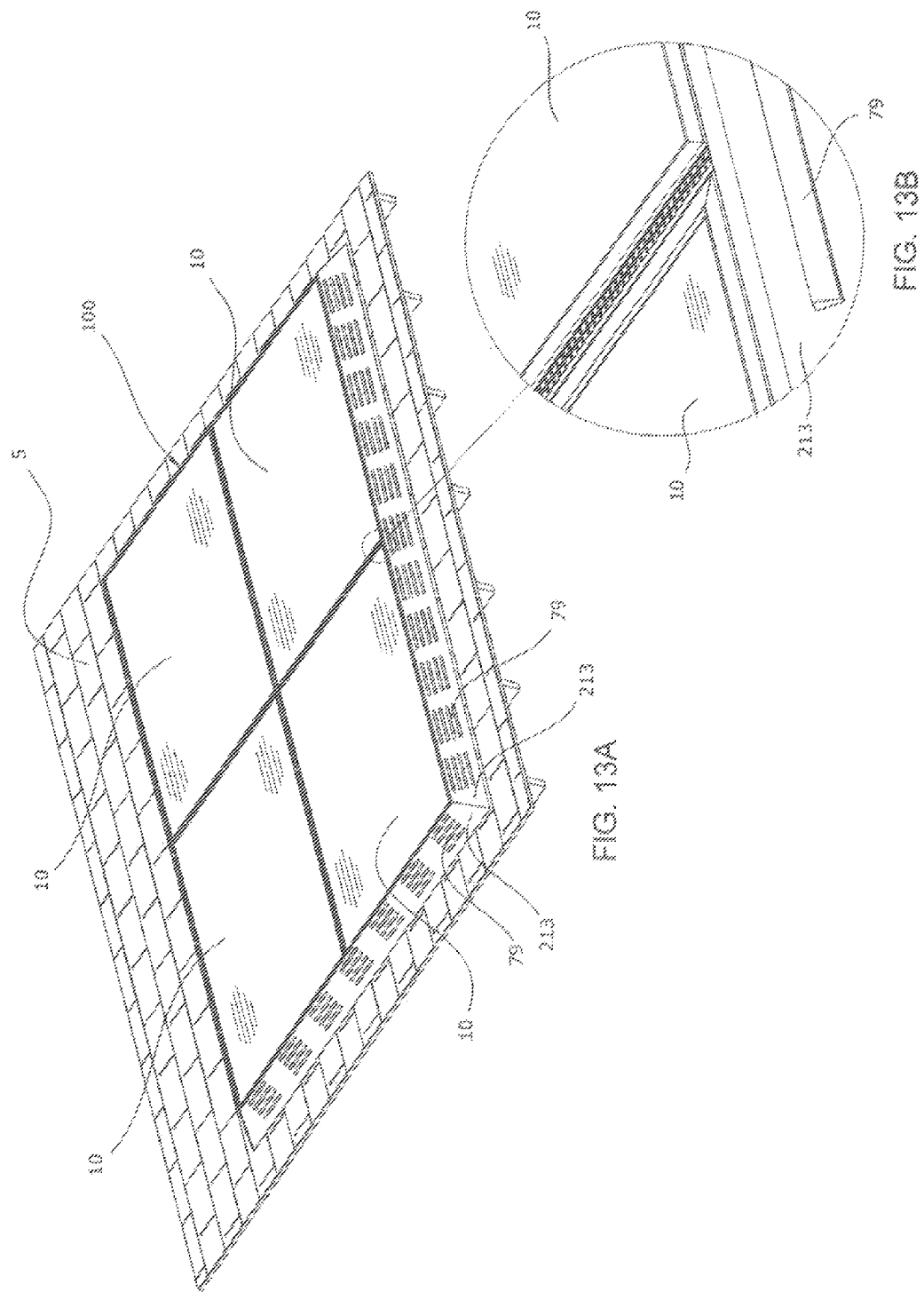

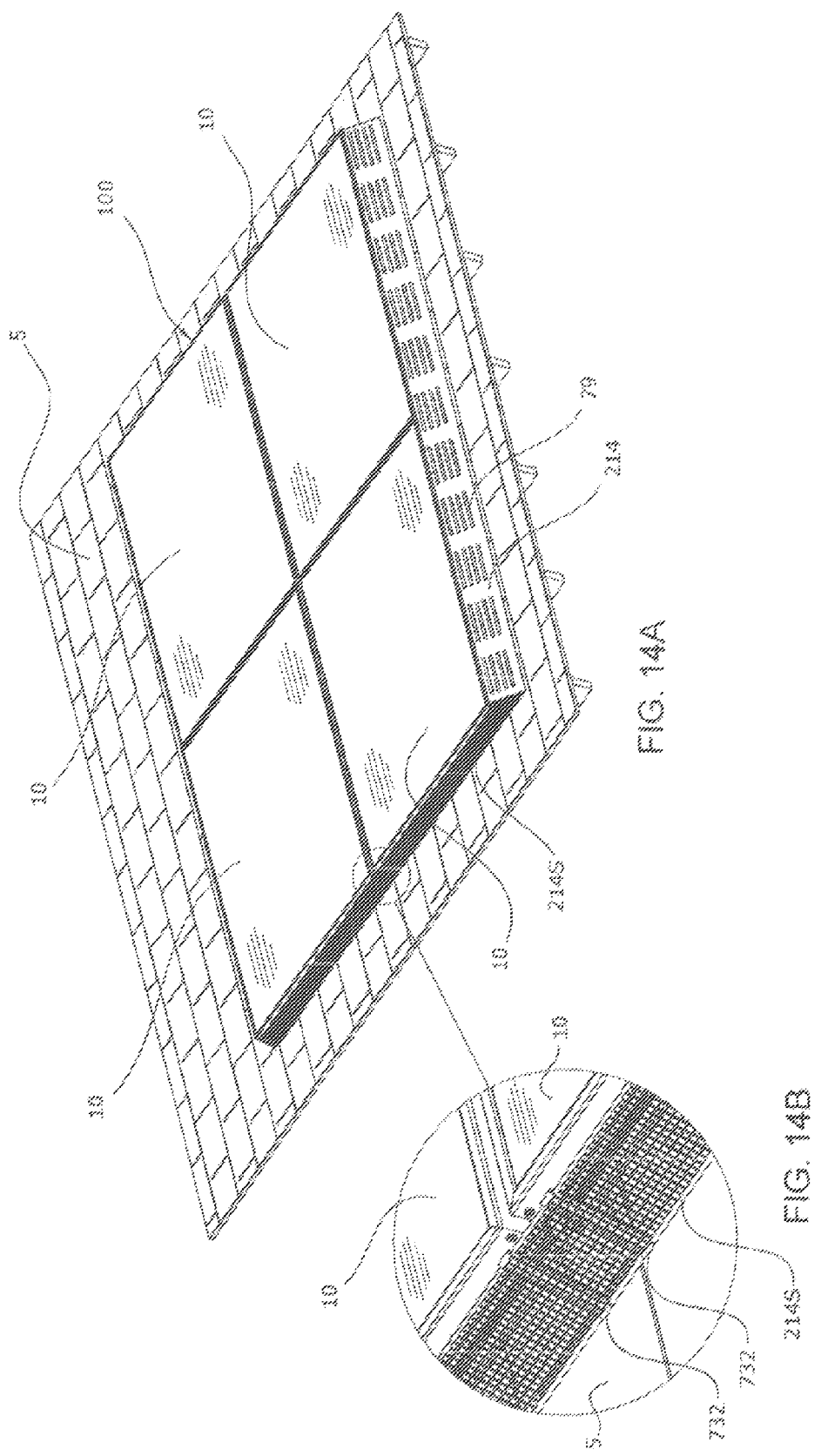

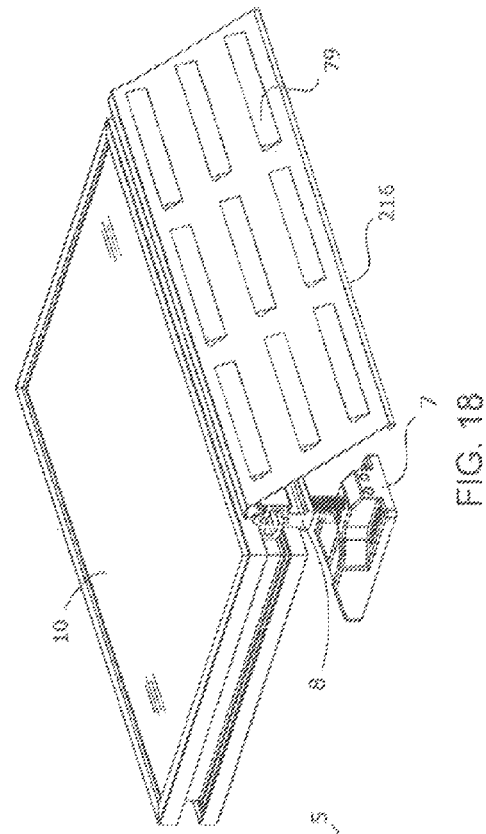
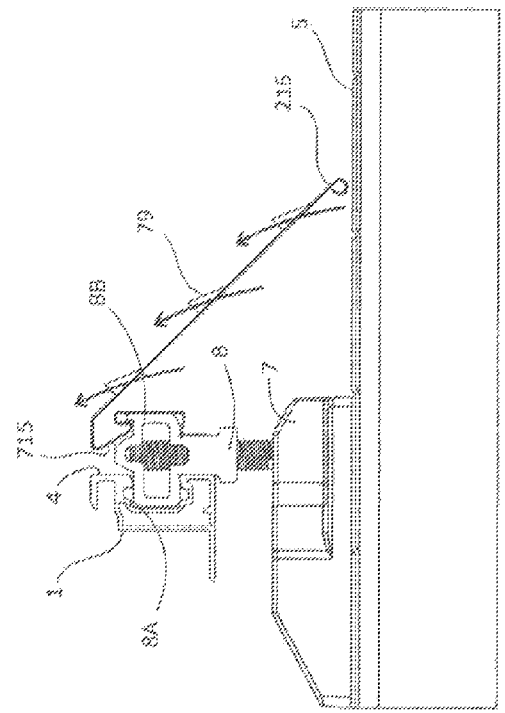
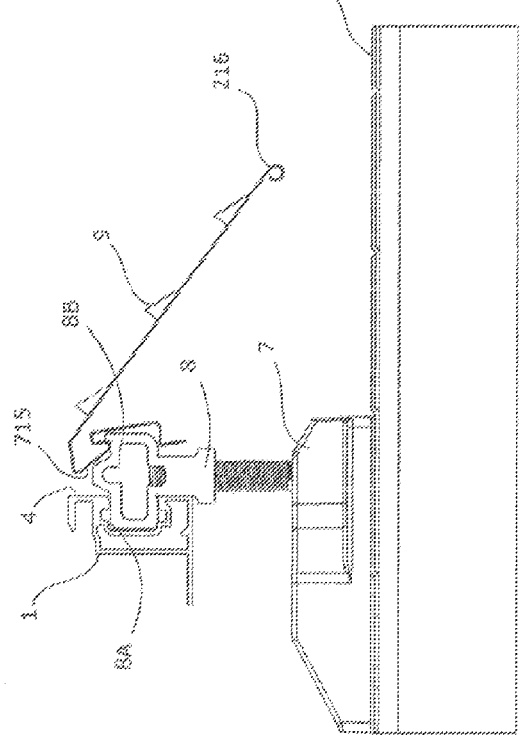
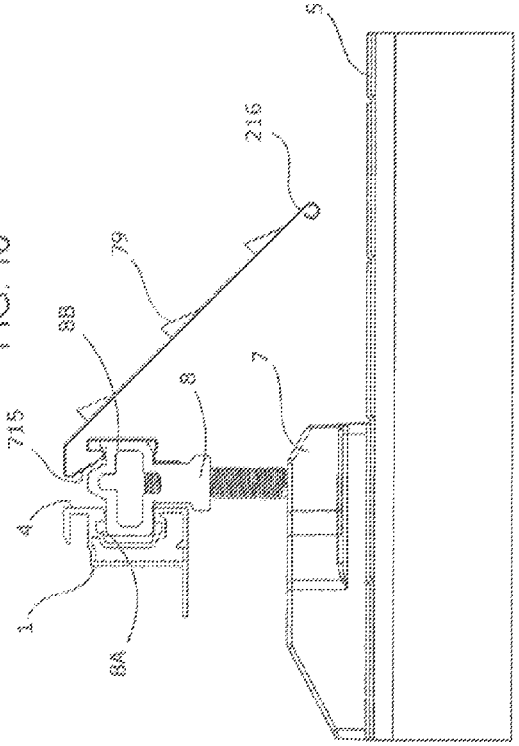

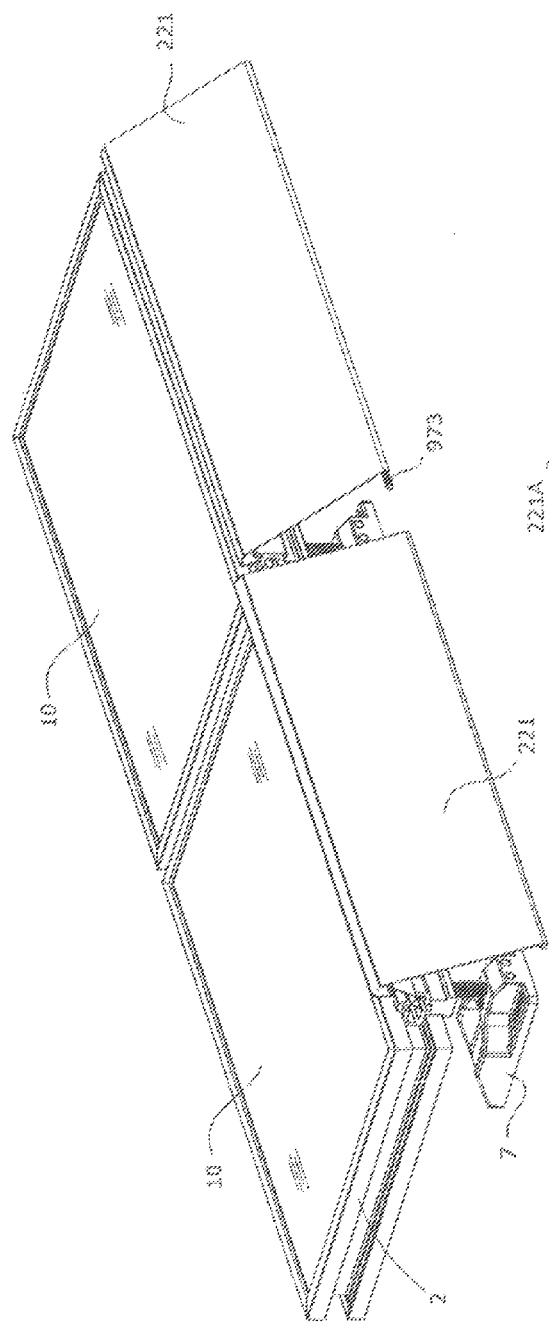
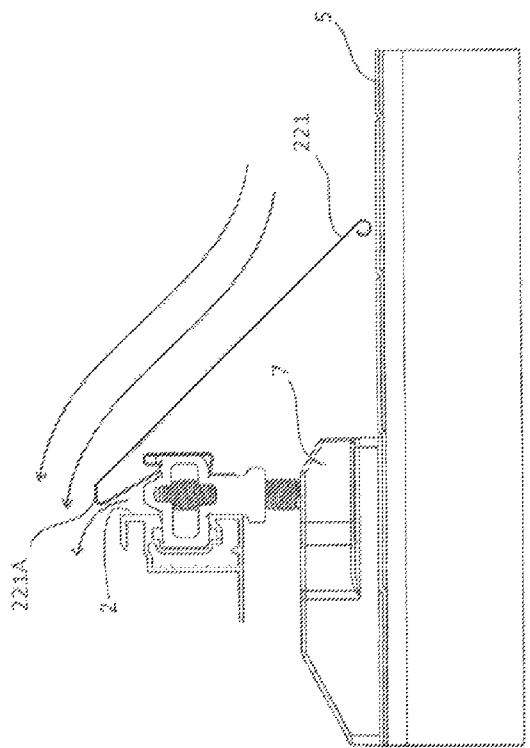
FIG. 20
FIG. 21

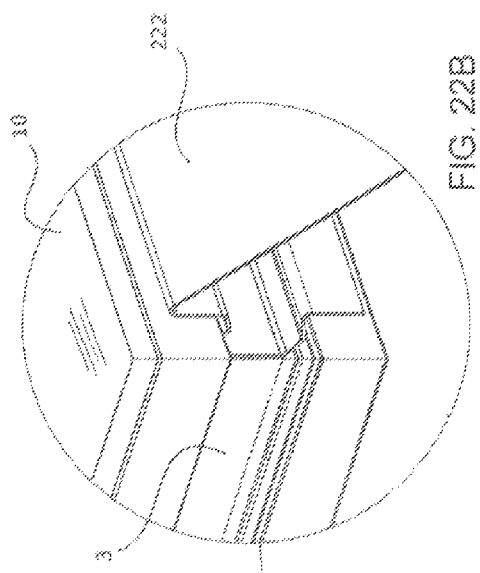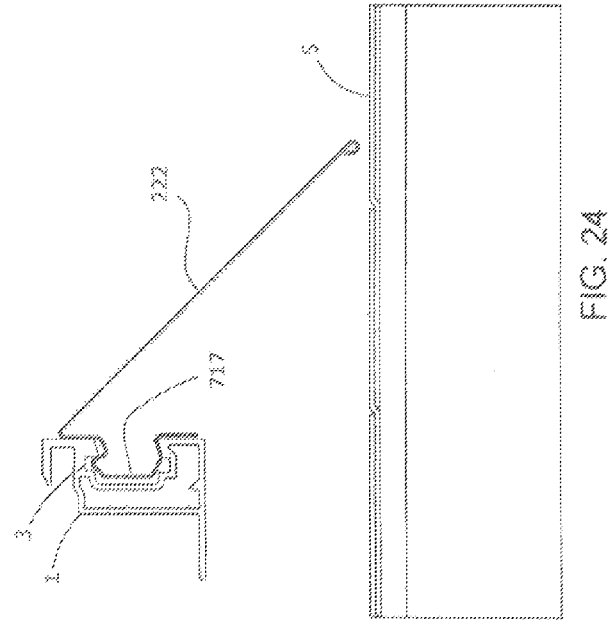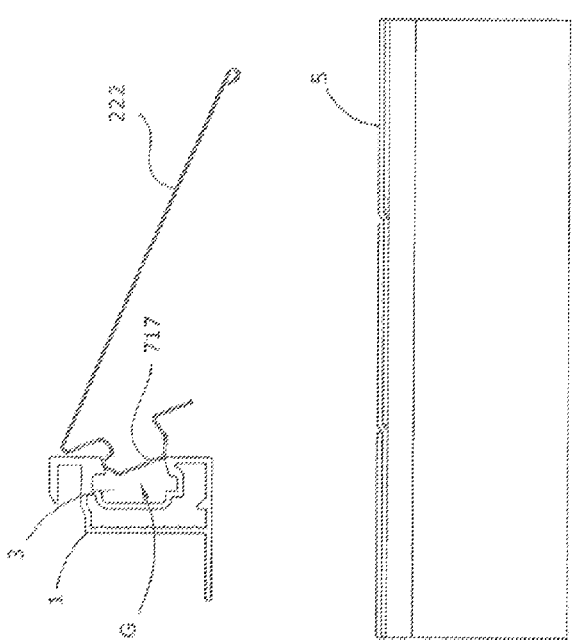

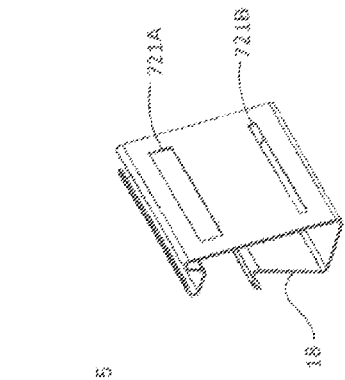
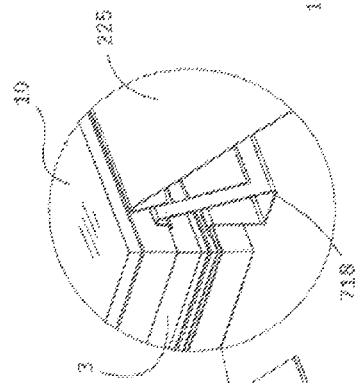
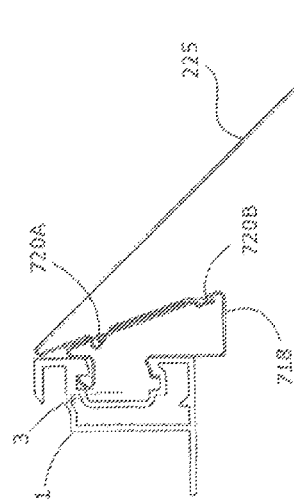
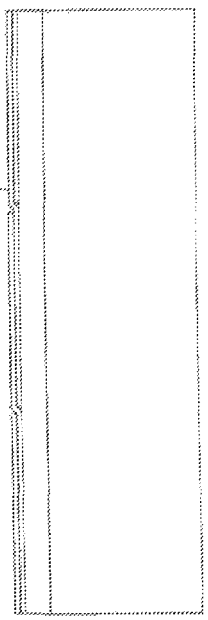
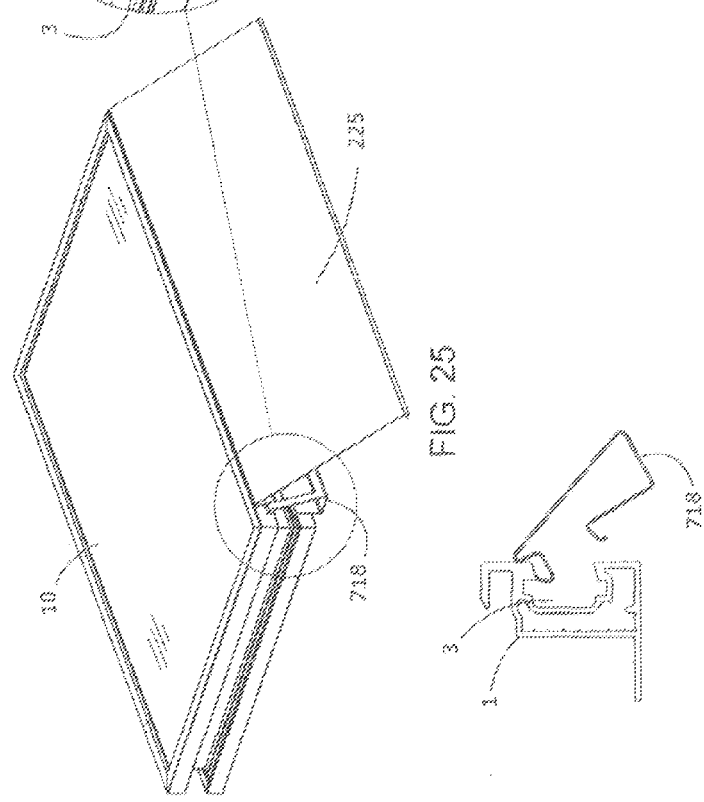
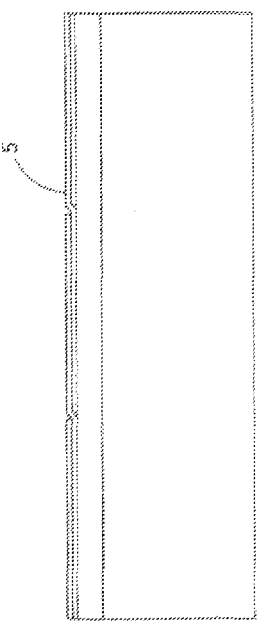

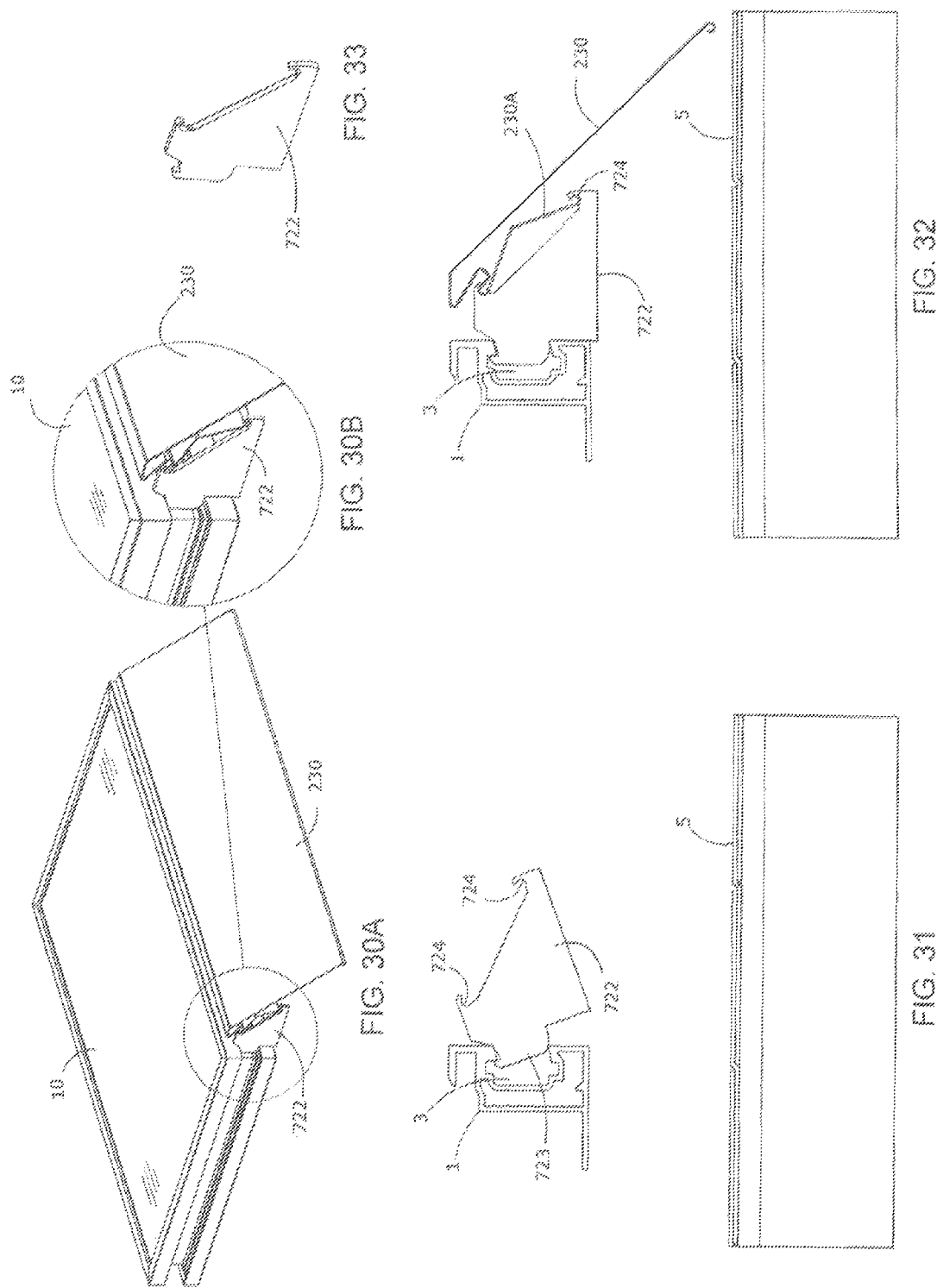

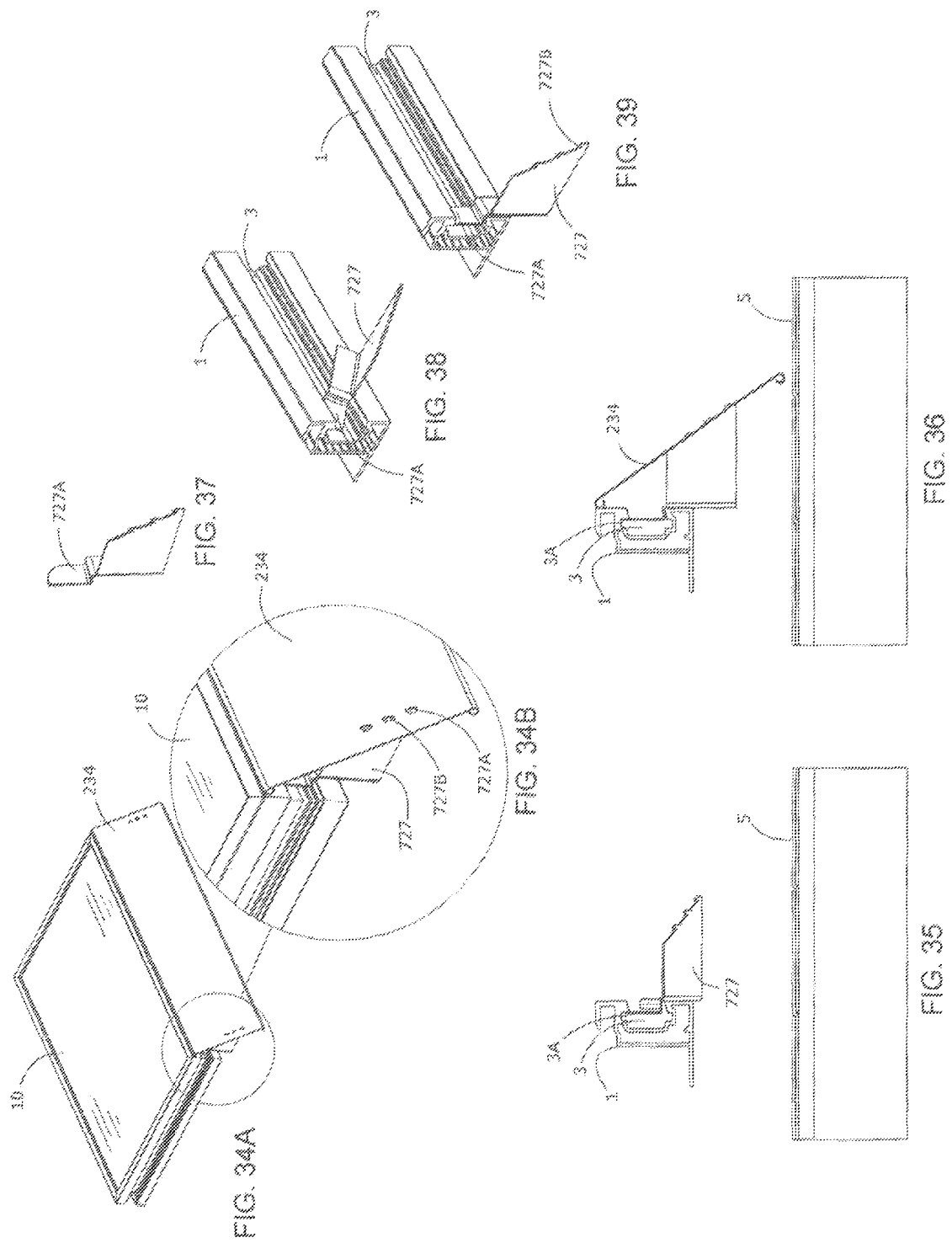

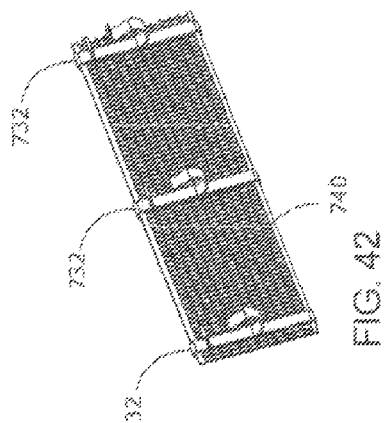
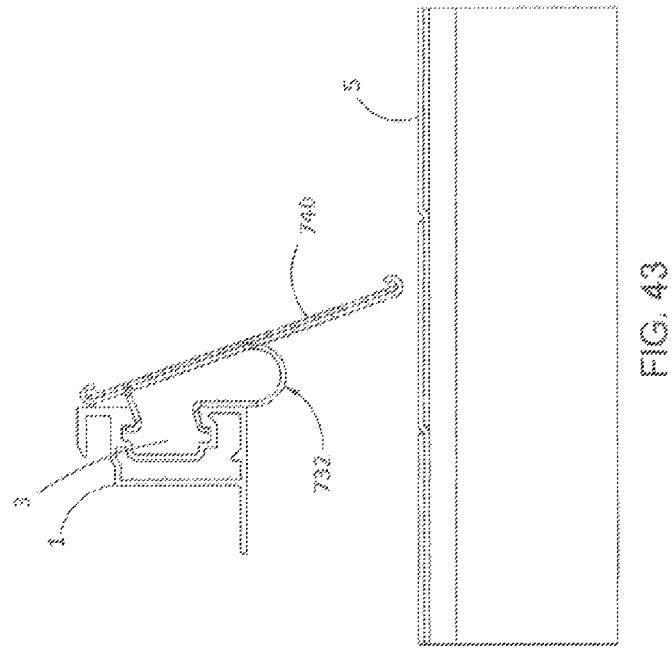
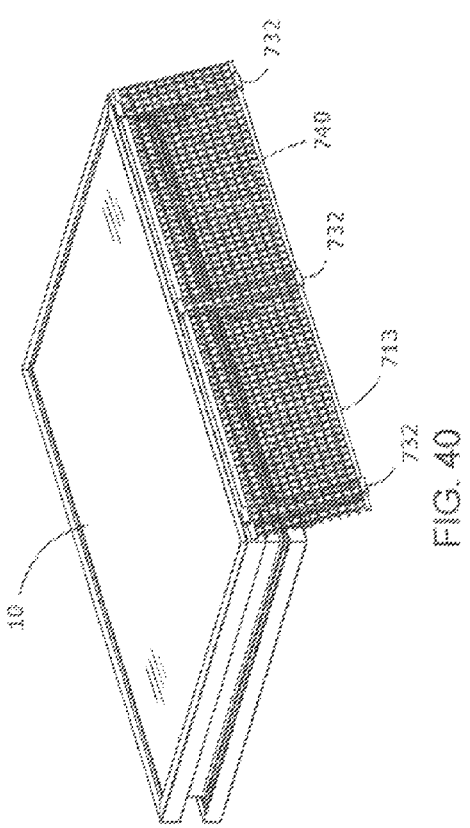

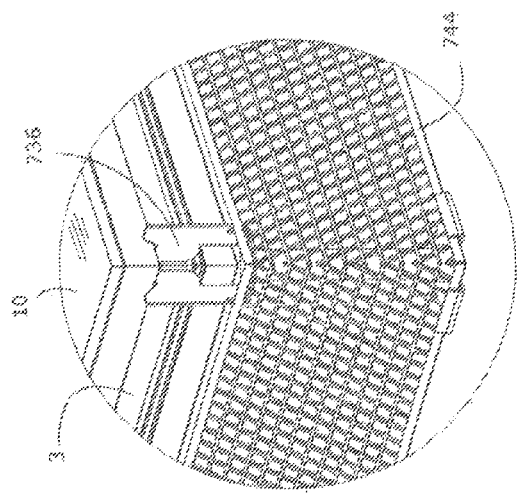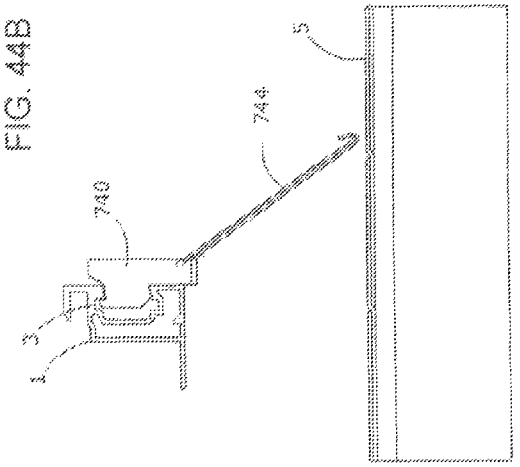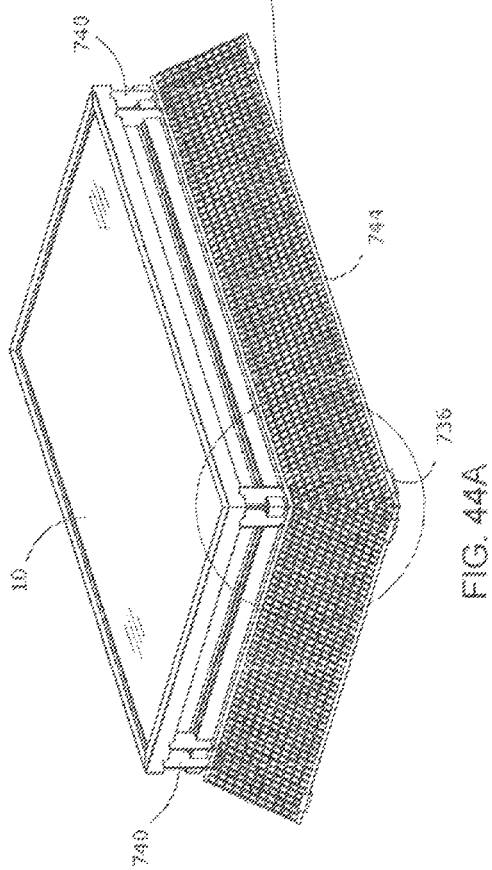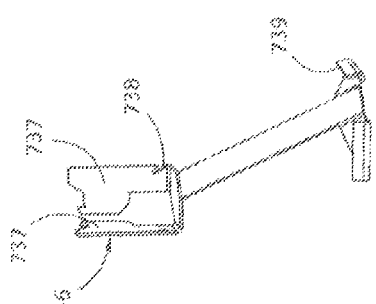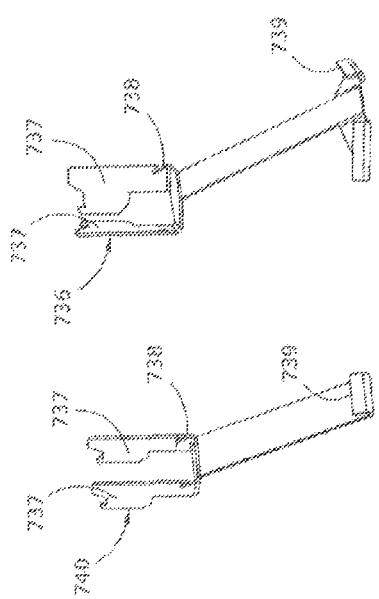

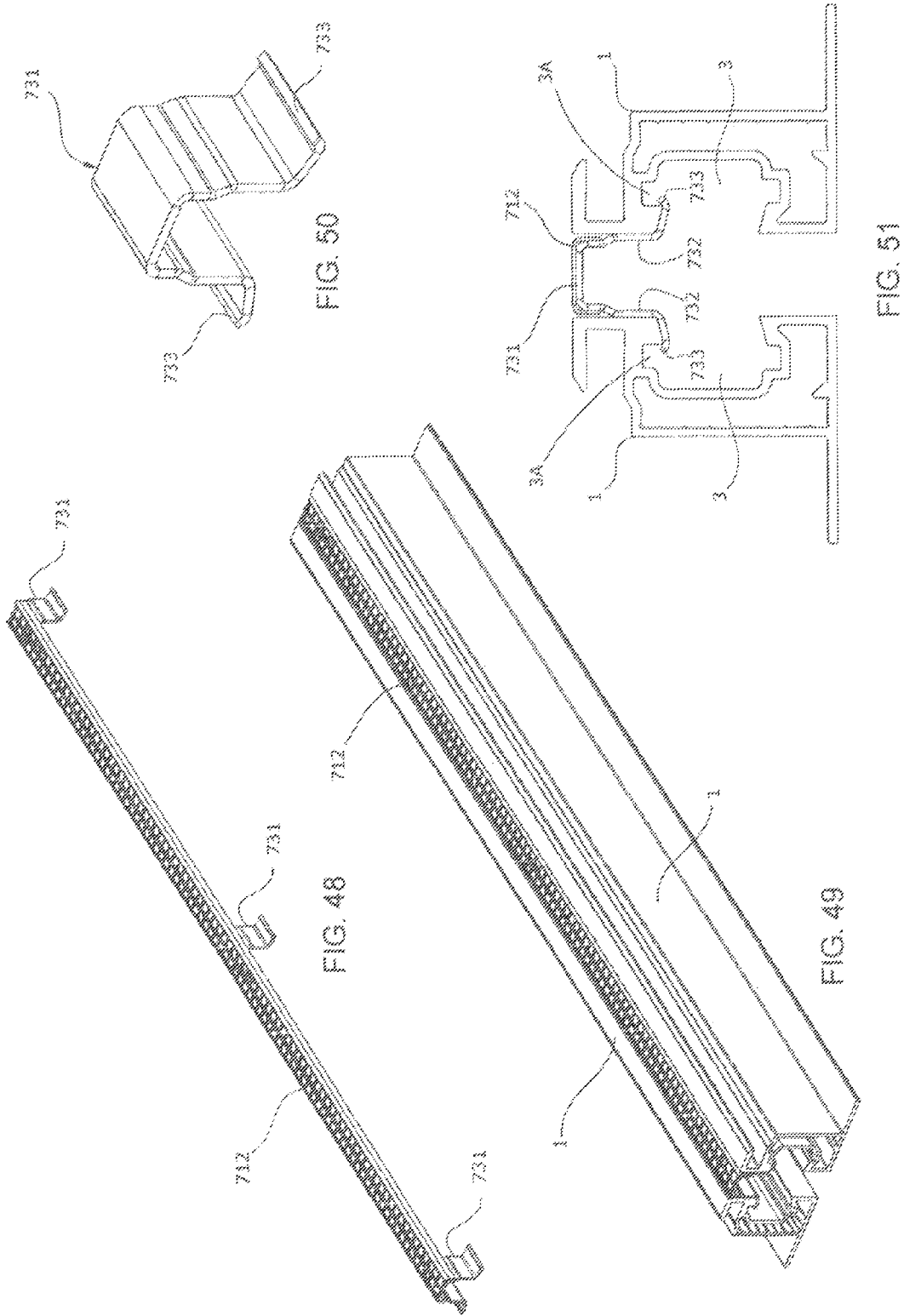

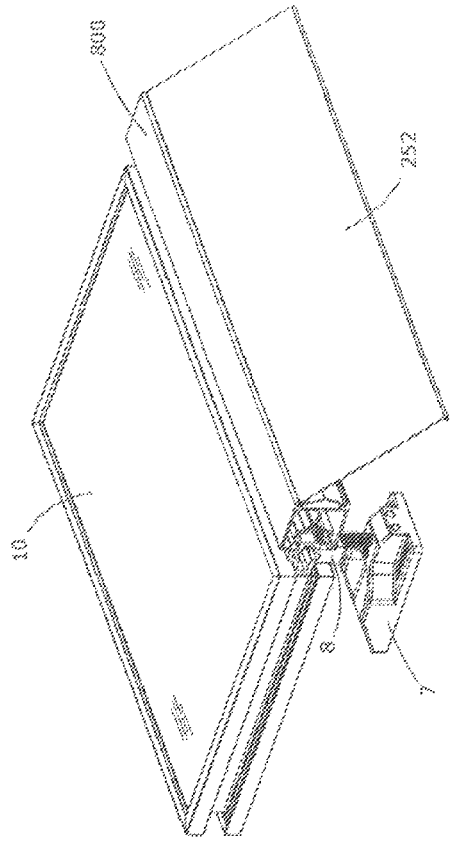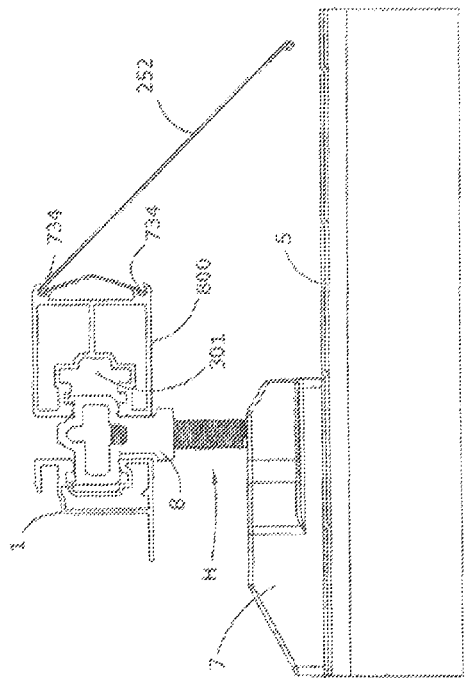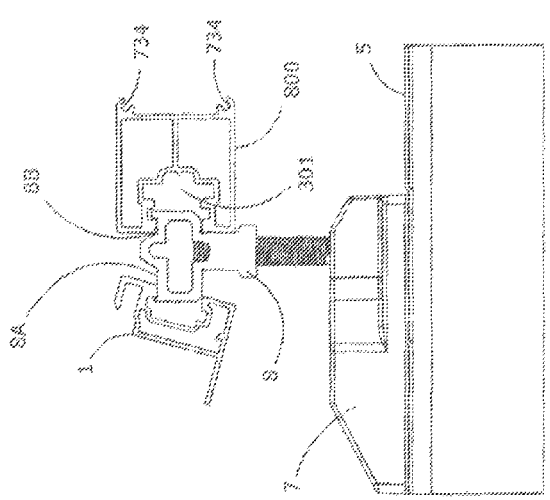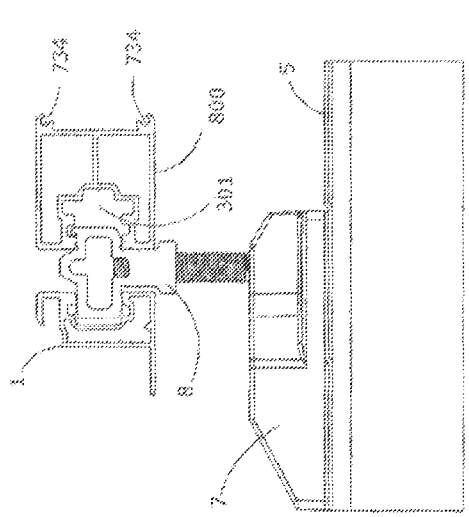

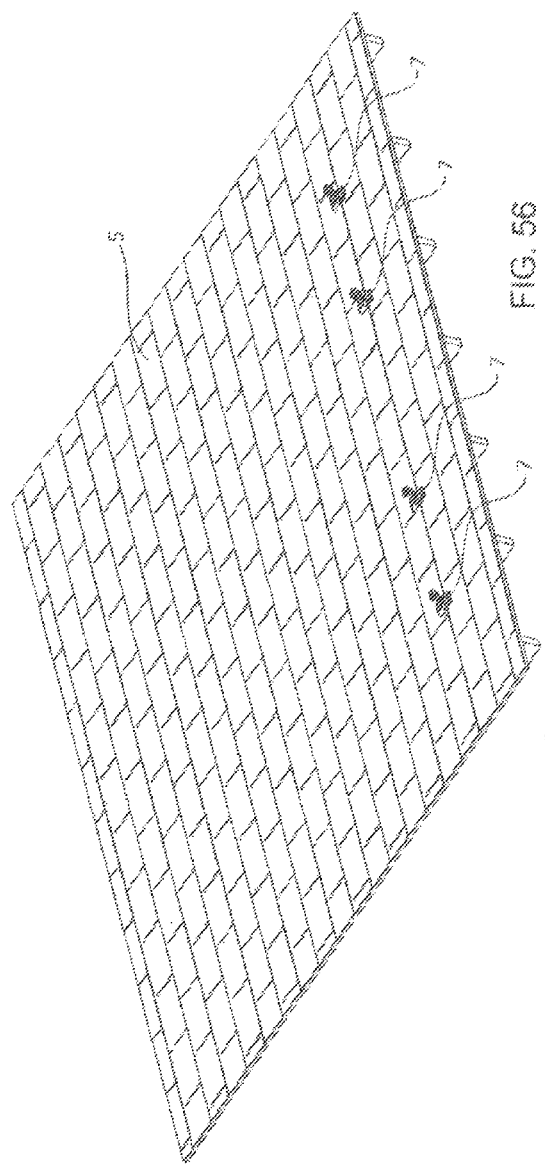
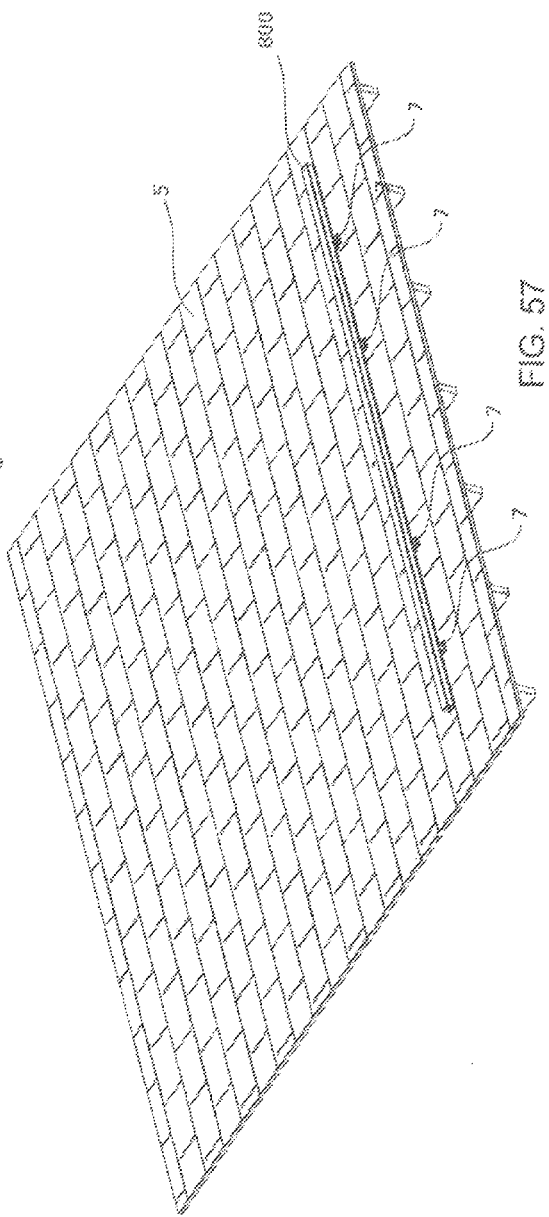

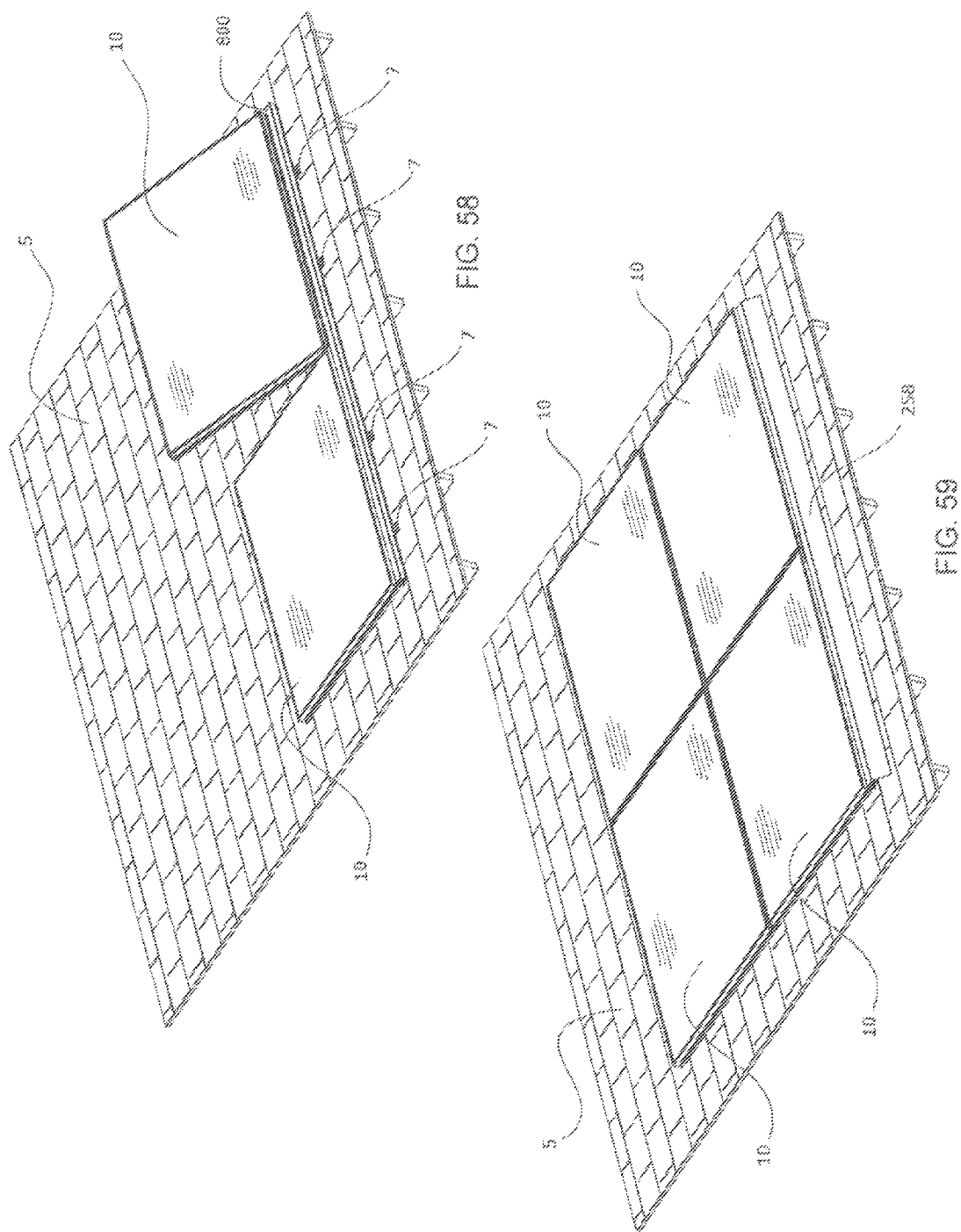

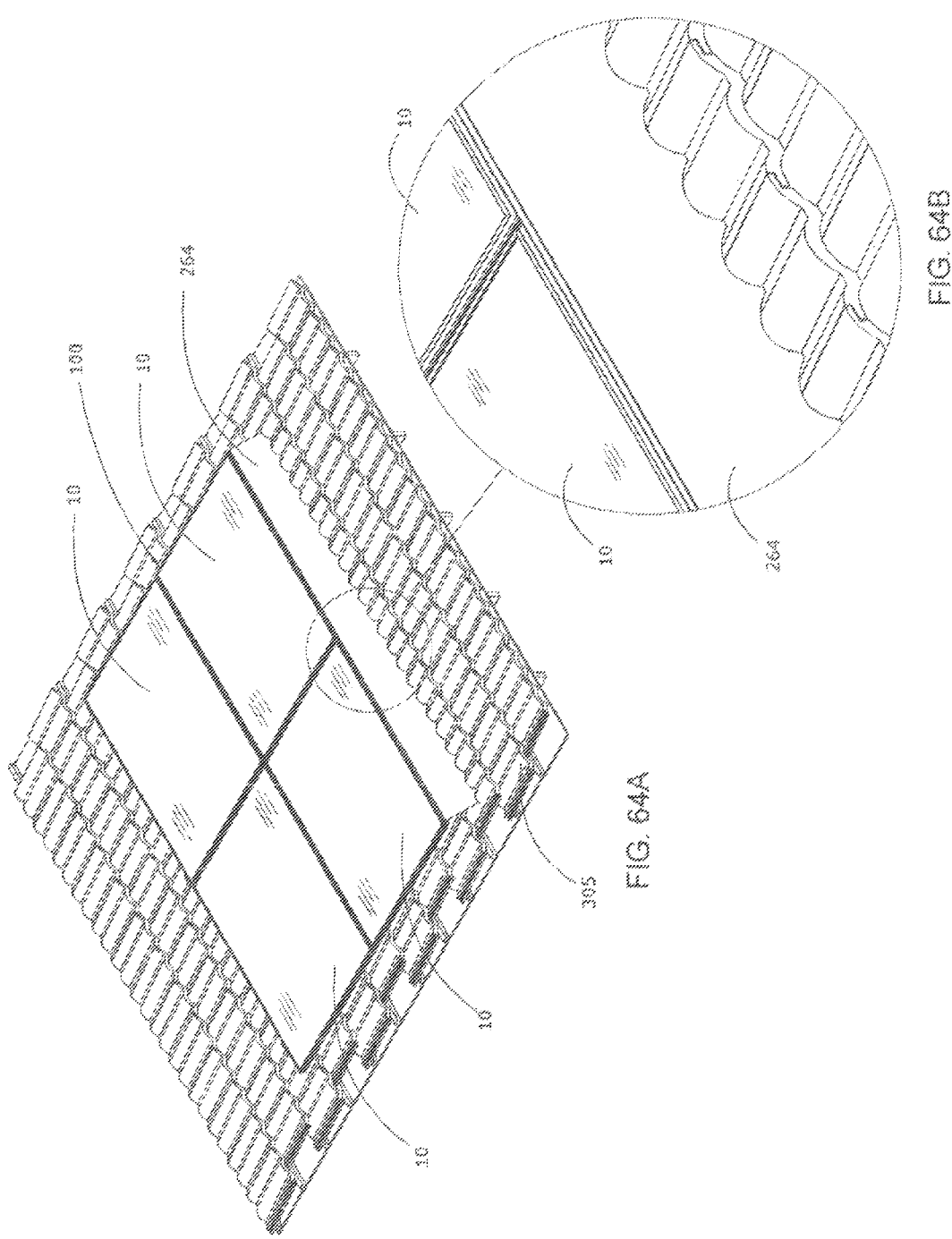

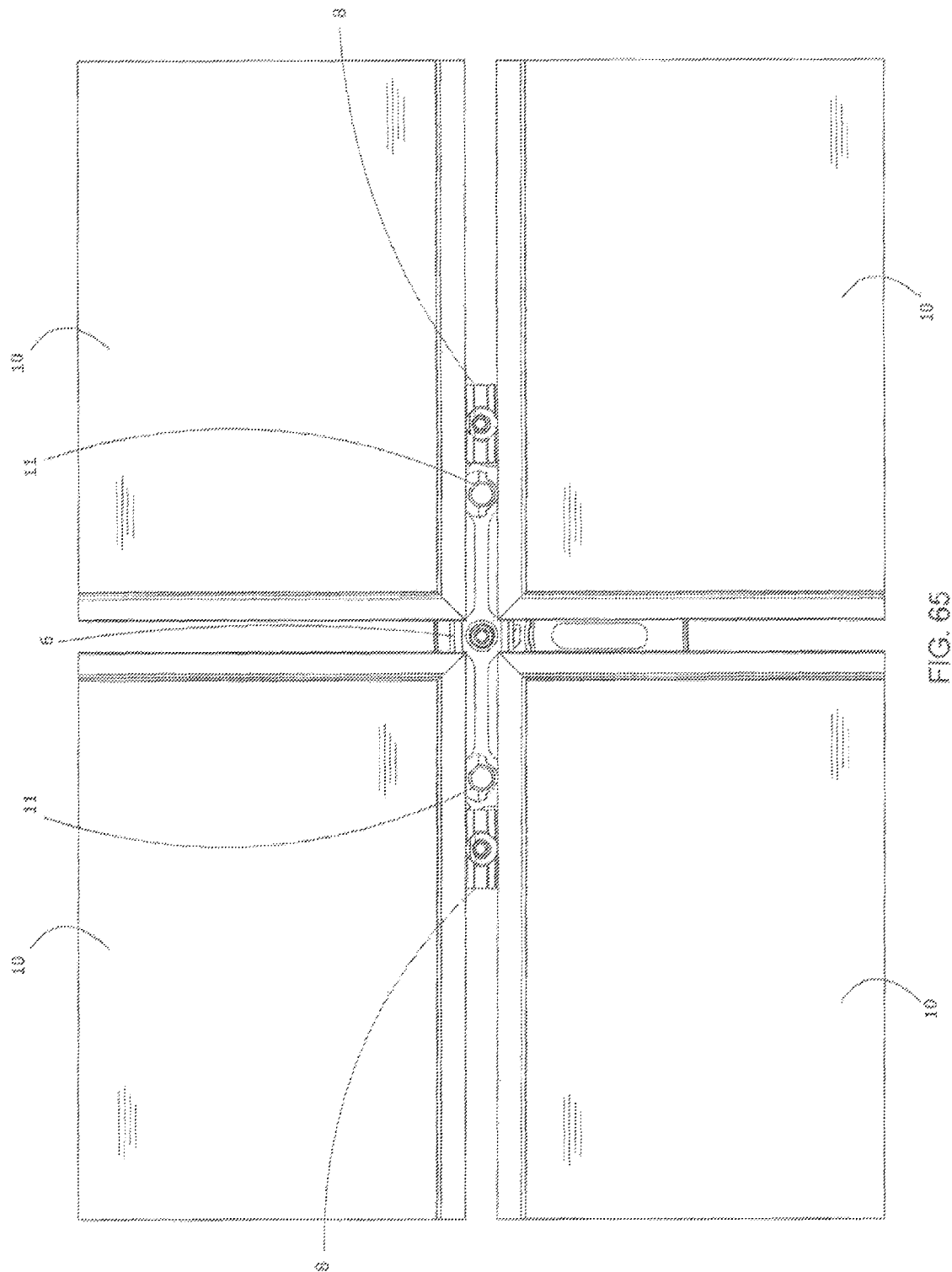

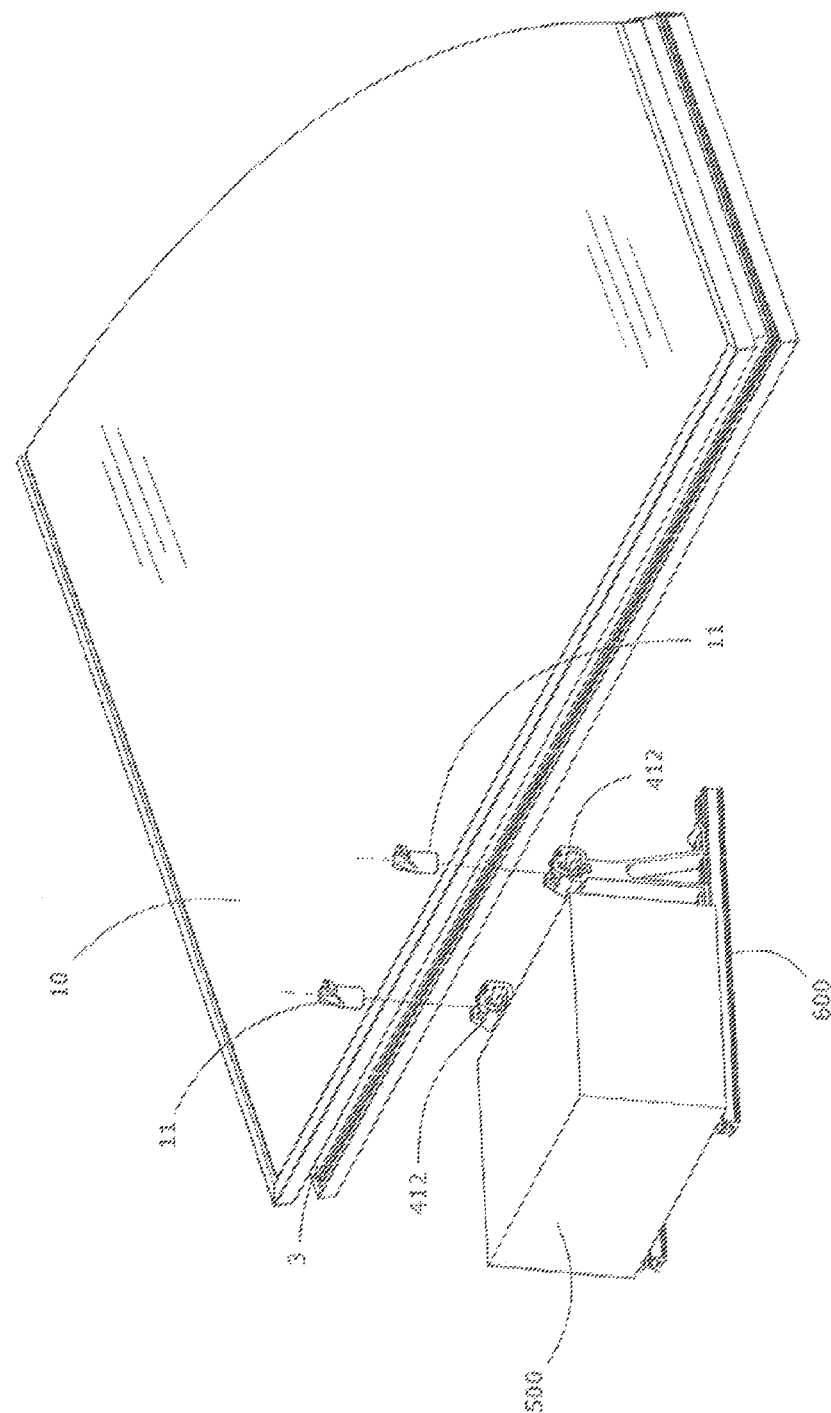

SKIRT FOR PHOTOVOLTAIC ARRAYS

CROSS REFERENCES

The present application claims the benefit of the filing date of U.S. Provisional Patent Application Ser. No. 61/421,626, filed Dec. 9, 2010; and U.S. Provisional Patent Application Ser. No. 61/421,629, filed Dec. 9, 2010. The foregoing applications are incorporated by reference in their entirety as if fully set forth herein.

BACKGROUND

It is common in the art to install photovoltaic (PV) arrays at an offset height above a support surface, such as a roof surface (of shingle, tile, roof membrane or the like). Such a mounting arrangement may provide an air gap beneath the PV array. The offset height distance may provide space for wire management and to allow for PV arrays or PV modules to be mounted above vent pipes and other common roof obstructions. Gaps between PV module frames on the top surface of a PV array may be required to allow space for mounting hardware as well as to allow for dimensional tolerance variation, thermal expansion and the like.

The presence of an air gap opening on the sides of a PV array, as well as between PV module frames on the top surface, may result in organic debris (such as leaves and sticks) entering and becoming trapped under the array, which may in turn result in a fire safety hazard. Rodents/birds/insects and other pests may also enter through these opening and contribute to the accumulation of flammable material through the building of nests, as well as potentially damaging electrical wires contained beneath the array. Regardless of debris, flames from a building fire may enter the air gap beneath an array and compromise the fire safety rating of the roofing material located underneath by trapping hot air, gases, vapor or plasma that typically dissipate if not otherwise confined. Furthermore, in some installations a PV array may be installed such that a gap beneath the PV array allows a viewer to see underneath the PV array, thereby degrading the overall aesthetic appearance of the PV array.

It may be therefore desirable to have a method, apparatus and system for preventing animal intrusion and organic debris from accumulating beneath arrays in addition to impeding open flames from entering the air gap and blocking or limiting the spread of flame over the roof. It may also be desirable to have an apparatus, method and system for screening unfavorable view angles beneath a PV array, or otherwise obscuring the area beneath a PV module or portions of a PV array. Some attempts have been made to affix skirt elements to an edge of a PV array for visual screening. However, these systems suffer from a number of drawbacks.

Prior skirt systems do not appear to provide adequate structural support. For example, prior systems typically connect a skirt to a mounting foot or a rail of a PV array yet not to a coupling that may be located in a region where the corners of four PV modules meet. Therefore, on a steep roof the weight of the PV array plus other loads, such as snow or an installation technician may not be properly supported, especially in the 4-corners region.

Prior skirt systems also do not appear to provide a means to accomplish the desired blocking the spread of flames or providing visual aesthetics by blocking a view of the area beneath a PV module or array, while allowing for enough airflow to adequately reduce the temperature of the PV array. It is well known in the art that increased PV module temperature reduces total power output. Therefore, it is desirable to provide some means for allowing airflow beneath a PV array.

Prior skirt systems do not appear to provide skirts that adequately block animals and debris since such systems do not typically cover enough of the gap beneath a PV array to be sufficient. For example, roof surfaces are rarely flat yet prior systems provide only a rigid, flat screen, thereby resulting in gaps between the screen and the roof surface. Prior systems also do not provide height adjustability so that a screen may be moved closer to or in contact with a roof surface.

Prior skirt systems require numerous parts which increase the cost of installation for the PV array.

Prior skirt systems also appear not to provide a simple method, apparatus or system for creating a ground bond between a skirt and a PV array. In most, if not all cases of prior systems a separate ground wire would be required to properly ground the skirt, as is required by building regulations in many regions of the world. The parts and labor associated with running a separate ground wire to a skirt is a significant cost. Furthermore, many on-roof grounding systems have suffered problems in the field due to corrosion, which exacerbates the problems of post-installation addition of grounding wires.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, apparatus, tools, and methods which are meant to be exemplary and illustrative, not limiting in scope. In various embodiments, one or more of the above-described problems have been reduced or eliminated, while other embodiments are directed to other advantages or improvements.

One embodiment of a skirt for photovoltaic arrays provides a screen portion, a groove portion, and a separate coupling adapted to couple the skirt to the skirt of an adjacent photovoltaic array and to a photovoltaic module. Another embodiment provides a screen portion comprising an angled louver and is adapted to partially obscure an area substantially beneath a PV module in a PV array. A further embodiment provides an edge blocking skirt for a PV array comprising a screen portion adapted for mounting a bottom of the screen portion substantially close to a roof. The following embodiments and aspects thereof are described and illustrated in conjunction with systems, apparatus, tools, and methods which are meant to be exemplary and illustrative, not limiting in scope. In various embodiments, one or more of the above-described problems have been reduced or eliminated, while other embodiments are directed to other advantages or improvements.

In addition to the exemplary aspects and embodiments described above, further aspects and embodiments will become apparent by reference to the figures and by study of the following detailed descriptions.

BRIEF DESCRIPTION OF THE DRAWINGS

Demonstrative embodiments are illustrated in referenced figures and drawings. It is intended that the embodiments and figures disclosed herein are to be considered illustrative rather than restrictive.

FIGS. 3A-3D show profile views of an embodiment of a skirt with a groove.

FIG. 3E shows a perspective view of the embodiment shown in FIGS. 3A-3D.

FIGS. 4A-4B show perspective views the inside or up-roof side of two skirts that have been linked together via an interlock containing couplings.

FIGS. 5-8 show a sequence of installation steps for an embodiment of a skirt.

FIGS. 9-12 show a method for using a skirt as a jig.

FIG. 13A shows the same array depicted in FIG. 1 except further comprising an array skirt installed on all four sides of the array.

FIG. 13B shows a detail view area in circle of FIG. 13A.

FIG. 14A shows a PV array with skirt mounted on the front and side screens mounted on the remaining sides of the array.

FIG. 14B shows a detail view area in circle of FIG. 14A.

FIGS. 16-19 show a number of views of an embodiment of a skirt with louvers.

FIGS. 20-21 show how some embodiments contemplate that a skirt also includes a pin for rigidly coupling two skirts together.

FIGS. 22-24 show an embodiment of a low cost single piece skirt that may be attached directly to a groove located on the outside surface of a module frame.

FIGS. 25-39 show alternate methods of attaching further embodiments of array skirts to the frame of the groove.

FIGS. 30-33 show a frame engagement clip that may contain a ridged male feature that may elastically deform a frame groove when inserted thus resulting in a spring induced clamping force that secures the clip in place.

FIGS. 34-39 show an additional embodiment of a frame groove compatible clip in which male engagement feature of a rotatable groove attachment clip may be inserted laterally into the frame groove at an approximate angle as shown.

FIGS. 40-43 shows an additional frame groove compatible spring clip for mounting screens to the sides of a module or array.

FIGS. 44-47 show frame engagement clips that may be inserted into the frame groove at the corners and sides of modules, respectively.

FIGS. 48-51 show an embodiment of a module gap spring clip that may be used to install top screens to protect against entry of organic material, rodents, burning embers etc. at the gap between adjacent module frames.

FIGS. 52-55 show an extrusion span jig for aligning modules and enabling rapid installation.

FIGS. 56-57 show a rooftop surface with height adjustable mounting feet installed in predetermined locations and an extrusion span jig installed onto the mounting feet.

FIGS. 58-59 show a first row of modules installed on the mounting feet aligned with an extrusion span jig and an installed array with the skirt section attached to the extrusion span jig.

FIG. 64A shows a skirt embodiment comprising a scalloped lower portion that conforms to a shape of a curved tile roof.

FIG. 64B is a detail view of area in circle of FIG. 64A.

FIG. 65 discloses the manner in which the wedging fit of an anti-rotation component may prevent an interlock from disengaging from within a module frame groove due to rotation caused by downward module deflection created by heavy loading due to imposed forces from snow ice or wind.

FIG. 66 shows an accessory component assembly that may be used to mount electrical boxes of various types to a groove.

DETAILED DESCRIPTION OF THE INVENTION

Terms

While various terms may have their ordinary meaning or particular meaning in the art, for ease of understanding there is provided herein, both below and at other locations in this specification, a non-limiting explanation as to the minimum scope intended for understanding of the present specification. Terms may be in singular or plural or any tense while retaining the same general meaning.

Figure 1:
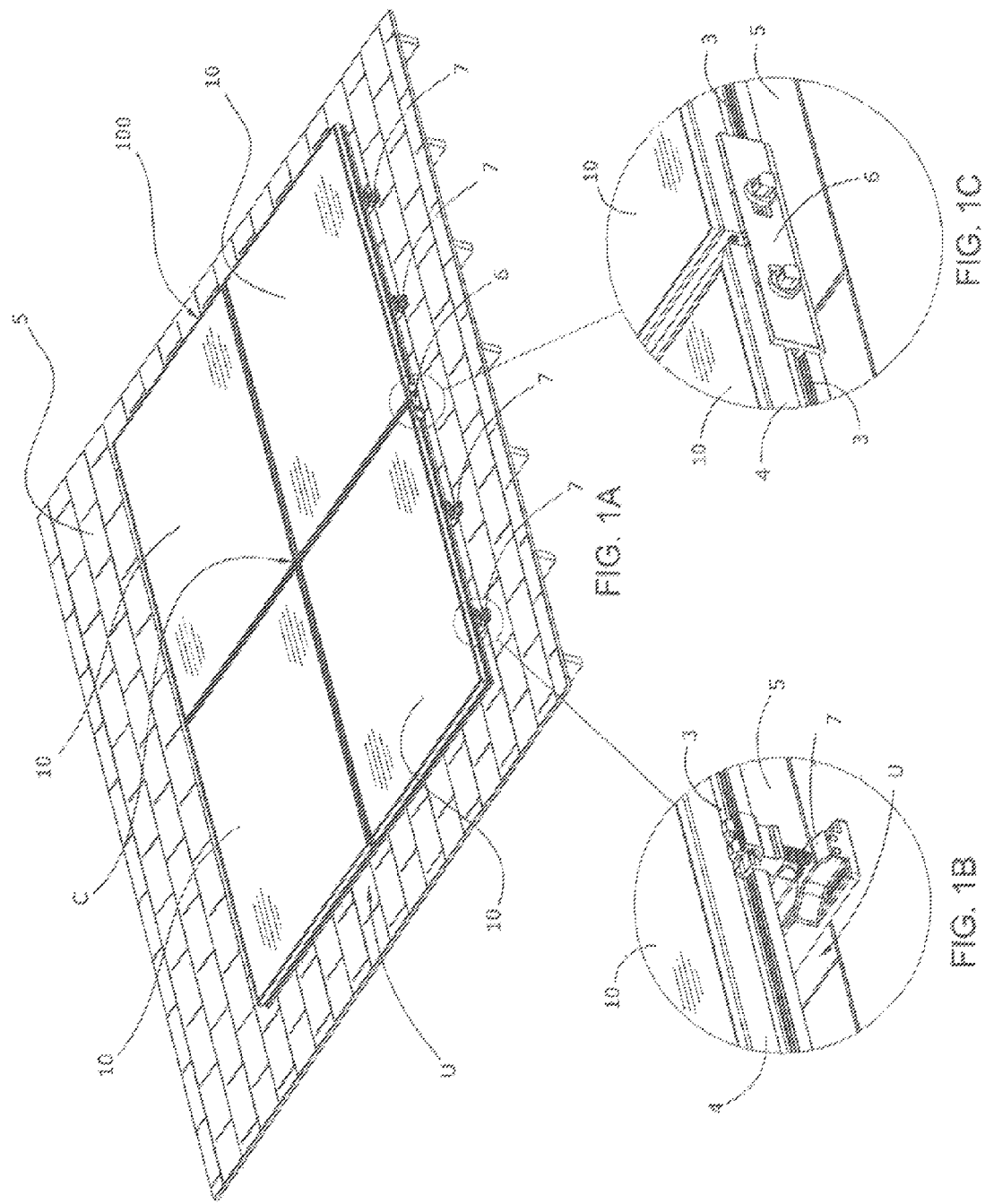
FIGS. 1A-1C show views of a PV array, including multiple photovoltaic modules.
Figure 2:
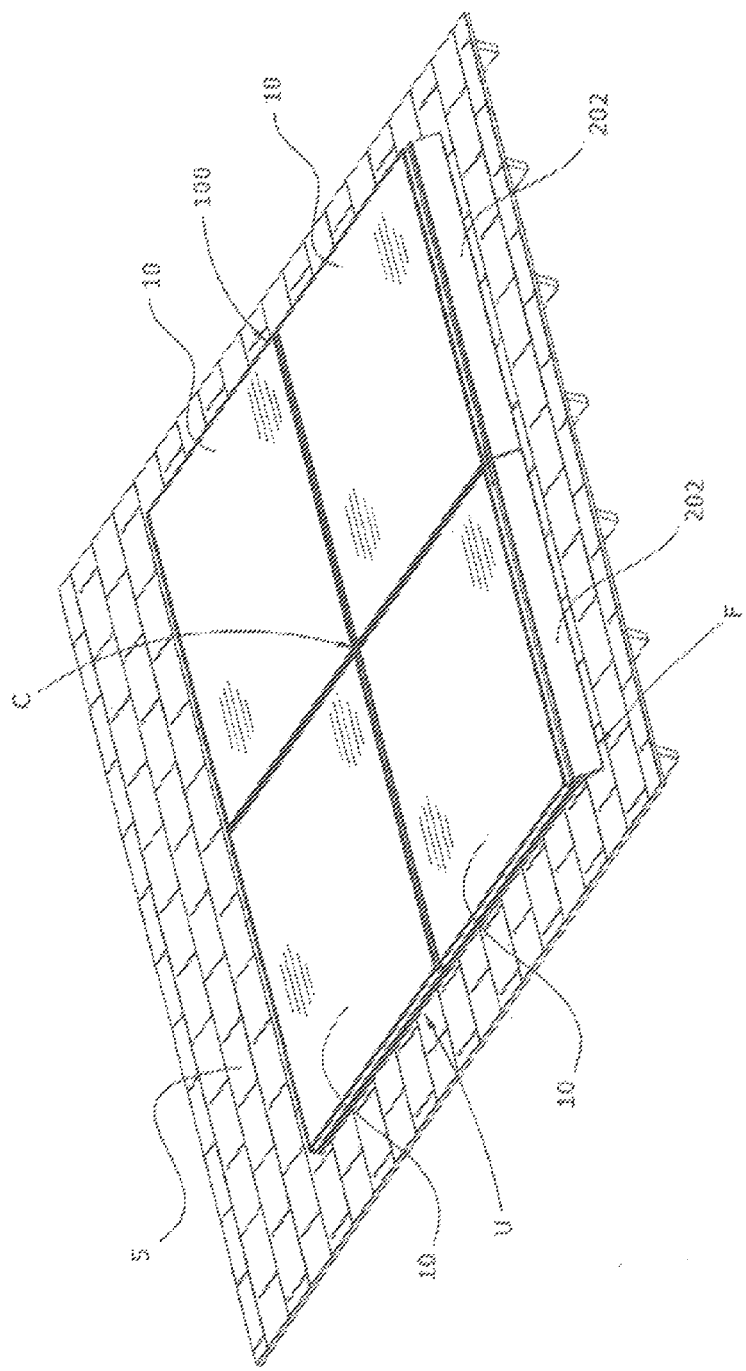
FIG. 2 shows a skirt positioned at the bottom or front edge of a PV array.

Adjacent refers to being positioned next to or adjoining or neighboring, or having a common vertex or common side. Thus, adjacent PV panels would include PV panels that have one side close to (from a few inches apart to abutting) and facing one side of another PV panel, such as shown in FIGS. 1, 1B and 2. Sometimes, but not always, the corners of adjacent panels align; so four adjacent panels would have one corner each that nearly or actually touch the other three corners, such as exemplified at Point C in FIGS. 1A and 2, and its descriptions.

Angled louver refers to a defined opening in an item's surface having fixed or movable and usually horizontal slats or blades for permitting air and/or light to pass through the surface having the louver(s). Louver(s) may also refer to the narrow opening(s) formed by the slat(s) or may refer to the slat(s) themselves. Angled louver therefore refers to a item having a surface where one or more louvers is placed or formed in such a way that the louver(s) are inclined at an angle of 1-179 degrees to the surface of the item, such as exemplified at feature 79 in FIG. 13A, 13B, and 18, and its descriptions.

Anti-rotation component refers to a device, item, feature or portion of an item that slows, minimizes, inhibits or stops that act or process of turning around a center or an axis. Such anti-rotation may be total, or may permit some minimal amount of rotation, usually not to exceed 5 degrees of rotation from an initial position. Such an anti-rotation component is exemplified as component 11 in FIGS. 3C and 7, and its descriptions.

Beneath a PV module or PV array refers to the area extending or directly underneath or below a PV module when it is positioned near a support surface, such as a roof. For a PV module secured or held above an essentially planar surface, the area beneath would usually include the area of a shadow cast on the planar surface by a light source (such as the sun) projecting from directly above the PV Module. Such an example of an area beneath a PV module is exemplified at Area U in FIGS. 1A, 1B and 2, and its descriptions.

Block refers to obstructing or impeding progress or the making of a flow or passage through either difficult or impossible to traverse, usually by placing obstacles in the way. As an example, to block a spread of flame would include objects that would limit, minimize, reduce, inhibit, obstruct or impede the spreading, propagation or traversal of flame, smoke or high heat in an area, such as under a PV array (usually between a PV array and a support surface, such as a roof). One such block would be a PV array skirt exemplified as skirts 202 and 203 in FIGS. 2 and 3A-3D, and its descriptions.

Bottom refers to the lowest or deepest portion or the portion furthest from the top, as well as the under-side or lower side of an item. Thus, the bottom of a skirt would be that portion, usually resembling an edge, of the skirt that is closest to or in contact with a support surface, such as a roof. One such bottom of a skirt is exemplified at Area F in FIG. 2, and its descriptions. Also, the bottom of a PV module or PV array is that area, usually a surface, that is closest to the support surface, which often defines the upper edge of an area beneath a PV module or PV array. One such bottom of a PV module or PV array is exemplified at location E in FIG. 3C, and its descriptions.

Bracket refers to a simple, essentially rigid structure in the general shape of an L, one arm of which extends approximately 70-110 (often close to 90) degrees from the other arm. A Bracket is often an overhanging member that projects from a structure (such as a portion of a wall or frame) and may be designed to support a load with a vertical component, such as a skirt. A bracket may also refer to a fixture projecting from a wall, column, frame or the like which may be used for holding, securing, positioning or supporting another object. One such bracket for supporting a skirt is exemplified as clip 722 in FIG. 33, and its descriptions.

Collinear refers to points, areas or items passing through or lying on the same essentially straight line, or creating a common or coaxial line. Collinear may also refer to sharing a common line, such as two intersecting planes. One example of collinear items would be collinear skirts which would have its longest dimension (length) extend from end-to-end in an essentially linear manner, such as along an edge of a PV module or PV array, as exemplified at Area L in FIGS. 7 and 8, and its descriptions.

Figure 62:
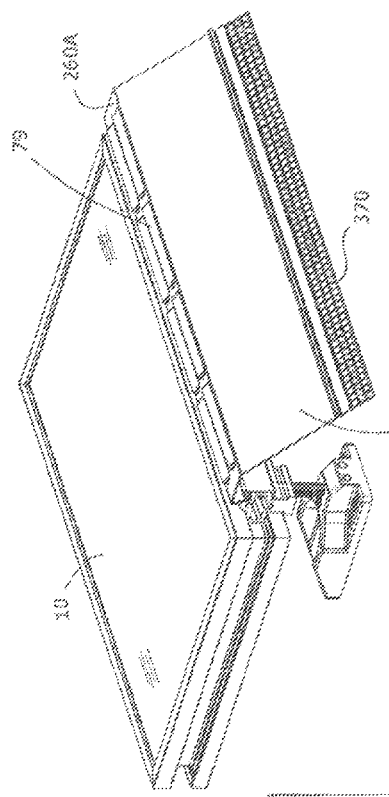
FIGS. 60-63 show a skirt embodiment comprising louvers located along the top portion of the skirt.
Figure 63:
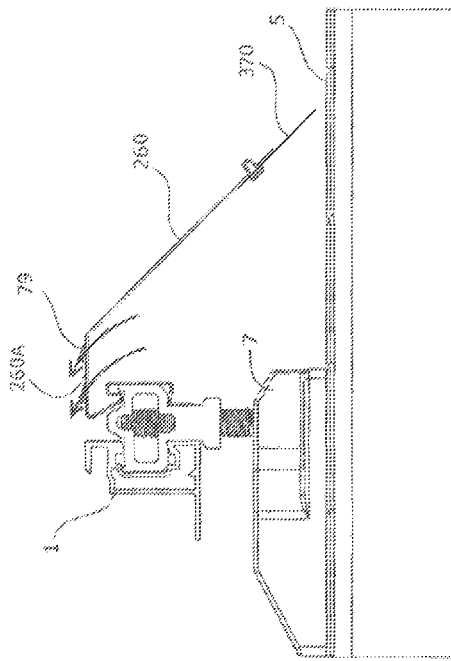
Figure 60:
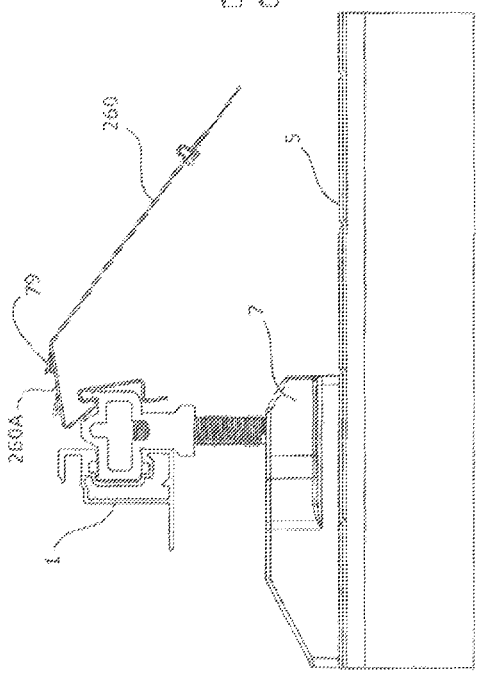
Figure 61:
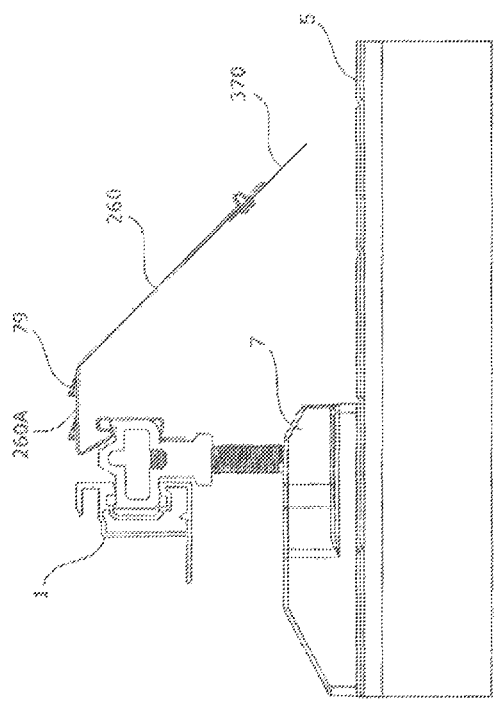

Complementary screen(s) refers to one or more additional screen(s) (a screen may be in the form of traditional sieve-type or other screen(s), hole(s), perforation(s), louver(s) or the like which are herein more generally referred to as a "screen", "screens" or "screen(s)") commonly used to partially or fully block a view past the screen or provide some rigidity while often permitting air (or other fluid) to flow through the screen). Complementary screen(s) form or serve as a complement with a first screen, which may have an effect such as to enhance, emphasize or complete the screening provided by a primary or first screen. One example of complementary screen(s) would be additional screen(s) placed on minor or narrower surfaces of a skirt, rather than the primary or first screen which is usually placed on the largest or primary surface. Some screens in a skirt are exemplified at side screen 214A in FIG. 14B, and its descriptions. Some complementary screens in a skirt are exemplified at screen 370 in FIG. 62, and its descriptions.

Contour refers to an outline representing, defining or bounding the shape or form of a figure, object, body, mass or surface. As an example, a support surface outline would have a contour being the topography of its uppers surface. For a support surface that is a flat roof, the contour would be essentially a line in the direction normal to the roof incline; but for a tile roof (such as clay roofing tile shaped like a longitudinal segment of a cylinder) the contour would be essentially shaped like a sine-curve (with a slightly different, half-circle, arc) in the direction normal to the roof incline. Some screens that follow a contour of a support surface, such as a roof, are exemplified at skirt 264 in FIGS. 64A and 64B, and its descriptions.

Couple refers to joining, linking, connecting or mating two or more objects or items together. For example, two skirts may be coupled together, as exemplified at Area K in FIG. 7, and its descriptions.

Coupling refers to an object, item, apparatus, combination, feature, link or the like that joins or connects two things together. For example, a two skirts may be coupled together by a coupling device, as exemplified at interlock 6 in FIG. 7, and its descriptions.

Flexible portion refers to a part, segment or portion of a device or feature that is capable of bending or deforming easily, such as made with a supple, pliable, pliant, or elastic material. For example, some skirts that have a flexible portion used to follow a contour of a support surface, such as a roof, are exemplified at screen 740 in FIG. 40, and its descriptions.

Following a curve of a roof tile refers to matching, mating or mimicking the uppers surface or contour of a roof tile. For a support surface, such as a roof that is undulating or curving such as a tile roof (for example, a clay roofing tile shaped like a longitudinal segment of a cylinder) the contour of each tile would be a half-circle, and the contour of the roof would be essentially shaped like a sine-curve (with a slightly different, half-circle, arc) in the direction normal to the roof incline. Thus to follow the curve of the plurality of roof tiles as normally mounted on a roof, the curve-following would have, or be deformed into, an essentially scalloped form. Some screens that follow a contour of an exemplar tile roof, are exemplified at skirt 264 in FIG. 64B, and its descriptions.

Front edge refers to the forward-most, leading, termination, outside limit or furthest protruding from the center portion of an object, item, apparatus, combination, feature, area or surface. For example, a front edge of a PV array would normally include the most down-slope (for a sloped or slanted support surface) terminus of the PV module frame for the most down-slope PV module in a PV array. Some front edges of a PV array are exemplified at location F in FIG. 1A, and its descriptions.

Groove refers to a long, narrow cut, rut, indentation, channel, furrow, gutter, slot or depression often used to guide motion or receive a corresponding ridge or tongue. Some grooves in the frame wall of a PV module are exemplified at Area G in FIG. 23, and its descriptions.

Height adjustable refers to change or adapt to bring items or components into a proper, desired or preferred relationship of a distance or elevation above a recognized level, such as the ground or a support surface. Some height adjustable devices are exemplified at Area H in FIG. 55, and its descriptions.

Obscure refers to conceal or keep an area or object from being seen, or to make an object or area faintly perceptible, lack clear delineation or indistinct. Some screens that obscure the area beneath a PV module or a PV array are exemplified at Area O in FIG. 12, and its descriptions.

Perforations refer to holes, piercings, penetrations or apertures passing through a wall or screen usually into or out of an area. Perforations may be in a pattern, such as rows or columns or other patterns. Some perforations in a skirt are exemplified at feature 9 in FIG. 18, and its descriptions.

Perimeter refers to an essentially continuous line forming the boundary, periphery or circuit of a closed geometric figure; the outer limits of an area. An example perimeter of a PV array is exemplified at Area P in FIG. 15, and its descriptions.

PV array refers to a plurality of photovoltaic modules connected together often in a pattern of rows and columns with module sides placed close to or touching other modules. An example PV array is exemplified at array 100 in FIG. 1A, and its descriptions.

PV module refers to a photovoltaic module (sometimes referred to as a solar panel or photovoltaic panel) is a packaged assembly of interconnected solar cells, also known as photovoltaic cells. A plurality of PV modules are commonly used to form a larger photovoltaic system referred to as a PV array, to provide electricity for commercial, industrial and residential applications. An example PV module is exemplified at module 10 in FIG. 1A, and its descriptions.

Rigidly couples refers to joining, linking, connecting or mating two or more objects or items together in a non-flexible manner that is difficult to bend or be forced out of shape. For example, two skirts may be rigidly coupled together, as exemplified at pin 973 in FIG. 20, and its descriptions.

Roof refers to a structure or protective covering that covers or forms the upper covering or top of a building. The upper surface of a roof is often used as a support surface for mounting, connecting or otherwise attaching a PV module or a PV array. For example, some roofs are exemplified at roof 5 in FIG. 1A, and its descriptions.

Roof tile refers to a manufactured piece of hard-wearing material such as ceramic, stone, metal, or even glass generally used for covering a roof. There are many shapes of roof tile, including flat and shaped like a longitudinal segment of a cylinder. Some roof tiles are exemplified at tile 305 in FIG. 64A, and its descriptions.

Scalloped refers to an object having an edge or border marked with or shaped into a wavy pattern, for example in the form of semicircles; also referring to an ornamental edge made up of a series of curves or curved projections. Some scalloped edged skirts are exemplified at skirt 264 in FIG. 64A, and its descriptions.

Screen refers to a fixed or movable partition, cover, curtain or shield used to divide areas. A screen may be in the form of traditional sieve-type or other screen(s), hole(s), perforation(s), louver(s) or the like (which are herein more generally referred to as a "screen", "screens" or "screen(s)") and may be commonly used to partially or fully block a view past the screen or provide some rigidity while often permitting air (or other fluid) to flow through the screen. Some screens in a skirt are exemplified at screen 214S in FIG. 14B, and its descriptions. Some complementary screens in a skirt are exemplified at screen 370 in FIG. 62, and its descriptions.

Screen portion refers to a part or entirety of an item which is formed or embodies a screen. Some screen portions of a skirt are exemplified at screen 214S in FIG. 14B, and its descriptions.

Separate refers to forming or viewing an object as an individual, different, or distinct unit-apart or by itself; not joined or physically touching another object. An example of a separate coupling which may be used with a PV array skirt are exemplified at skirt insert 252 in FIG. 54, and its descriptions.

Skirt refers to an edging, molding or covering that may be fixed to the edge of a PV module to conceal or block the bottom area under a PV array when the PV array is mounted to a support surface. Some skirts are exemplified at skirt 202 in FIG. 2, and its descriptions.

Support surface refers to a structure, such as a roof, table or the ground which may provide a base for securing PV modules to form a PV array. Some support surfaces are exemplified at roof 5 in FIG. 1A, and its descriptions.

Spread of flame refers to extending, distributing or dispersing over an area so as to extend the surface area, length or width of a fire or hot body of ignited gases, vapor or plasma.

Referring now to the figures, and particularly to FIGS. 1A, 1B and 1C, there is shown a PV array, such as array 100 comprised of photovoltaic (PV) modules, such as modules 10 mounted on a support surface noted at S, such as a roof 5. The modules 10 within this array 100 contain photovoltaic laminates, such as laminates 1 that are supported by appropriate support structures, such as frames 2, which may be made of aluminum or other material as known in the art, which may contain a groove, such as groove 3 located on an outside surface 4 of frame 2. As described in prior documents, groove 3 allows for the interlocking and direct attachment of PV modules to roof 5 or other support structure S by use of couplings such as interlocks 6 and may also include structures for attachment to roof 5, as by a foot (feet) 7 that connect to groove 3. In other embodiments PV modules 10 comprise a PV frame 2 without any groove 3. FIG. 1B is a detail view of the area in the leftmost circle of FIG. 1A, which shows a closer view of foot 7. FIG. 1C is a detail view of the area in the rightmost circle of FIG. 1A, which shows a closer view of interlock 6.

FIG. 2 shows a skirt positioned at the bottom edge or front edge of array 100, such as array skirt 202 installed on the front edge, shown at F, of array 100. Array skirt 202 may provide many benefits including, but not limited to, improved aesthetics, improved fire safety, and improved structural performance. Array skirt 202 may partially or fully obscure the air gap and mounting hardware located beneath a PV array, such as array 100.

FIGS. 3A, 3B, 3C and 3D show a profile view of an embodiment of a skirt, such as extrusion 203 with a groove 300 located on the interior surface, such as surface 500. The profile such a skirt design may allow for a pivot-fit connection of skirt 203 to a coupling, such as coupling 8, which is shown as located above a mounting foot, such as foot 7 which may have a base portion, such as base 9. Coupling 8 may also allow for a pivot-fit connection for a module 10 having a frame 2 containing a groove 3 on outside surface 4. A pivot-fit connection between the components and grooves 3 and 300 may be achieved by presenting male portions 8A and 8B of coupling 8 to female grooves. The grooves may then seat at least partially over the male portions 8A and 8B and then rotate down until the angle of the groove substantially aligns with the axis of the male portions 8A and 8B. To complete the pivot-fit connection, the PV module 10 or skirt 203 is simply pivoted down to its final angular orientation in the PV array. This final rotation causes bearing portions in the groove to bear against the male portions of the coupling 8 to restrain the PV module or skirt against upward or downward movement. The coupling may still allow for adjustment of the PV module position in the plane of the PV array to account for tolerance variations.

FIG. 3E shows how in order to further limit or inhibit the potential upward rotation of a skirt 203 on coupling 8 an anti-rotation component, such as component 11 may be attached to the coupling 8, such as by insertion into an aperture 12 formed into the top surface of coupling 8. When properly installed into aperture 12, component 11 will restrict or act to prevent or limit upward rotation of the skirt 203. Upward rotation is restricted by placing a surface 13 of the anti-rotation component 11 in direct contact with vertical surface 500 of skirt 203. Skirt 203 may be connected to coupling 8 before or after module 10 is installed and may be easily removed from array 100 by removing anti-rotation component 11 from aperture 12, thus allowing the upward rotation required for skirt removal.

FIGS. 4A and 4B show perspective views of the inside or up-roof side of two skirts 204 that have been linked together via an interlock 6 containing couplings 8. Interlock 6 may optionally further comprise the base portion 9 of mounting feet 7 as shown here. In some embodiments base portion 9 is eliminated. Anti-rotation component 11 may be inserted into apertures 13 in order to create a wedged fit that may resist rotational movement of skirt 20.

FIGS. 5-8 show a sequence of installation steps for an embodiment of skirt 205. FIG. 5 shows two skirts 205 placed end-to-end and ready to be interlocked together with interlock 6. Spacer plate 6A may be positioned between interlock 6 and skirts 10 to prevent skirt from sagging. Tool 300 may be utilized to rotate parallel couplings 310 of interlock 6 to connect interlock 6 to skirts 20. As shown in FIG. 6, skirts 20 may be connected to feet 7 and interlocked to additional skirts 205 along a perimeter of PV array 100. As shown in FIG. 7, anti-rotation components 11 may be inserted into feet 7 to further secure skirts 205 to feet 7. FIG. 8 shows the completed PV array 100 comprising PV modules 10, skirts 205, interlock 6, and feet 7. As can be seen here, interlock 6 may couple two PV modules 10 and two skirts 205 together. This arrangement may provide better structural performance than a skirt system that for example only provides a connection point from skirt to array at the mounting foot. Such a system could sag under heavy load at the 4-corners point where two PV modules 10 and two skirts 205 meet. In some embodiments interlock 6 may further provide a ground bond connection between modules 10 and skirts 205. In other embodiments interlock 6 may provide a ground bond connection between modules 10 and skirts 205 as well as a ground connection from one skirt 205 to the adjacent skirt 205.

In addition to providing aesthetic and other enhancements, another benefit of disclosed array skirts may be the ability for use as a jig or tool for controlling the location and alignment of modules positioned in the first installed row of an array 100. The method of installation for using a skirt 209 as a jig is shown in FIGS. 9-12. The use of skirt 209 for alignment purposes may provide a template for module installation in discrete and repeatable locations. In one embodiment skirt 209 is provided with a length that is the same as the length of PV module 10 plus a small amount to create a small gap between adjacent modules 10. As shown in FIG. 9, feet 7 may be installed on a roof first. Skirts 209 may then be interlocked together, as described above, and connected to feet 7 (as shown in FIG. 10). PV modules 10 may then be attached to skirts 209, using seam 330 between skirts 209 as a guide to determine where to place the modules. Subsequent rows of PV modules 10 may be installed above the first row in the usual fashion.

One skilled in the art will recognize that skirts 209 (and other skirt embodiments disclosed in this specification), when installed in this way, may provide a simple way to determine the layout of PV array 100 on a roof prior to installing PV modules 10. It would also be clear that PV array 100 may contain various numbers of rows and columns of modules 10 and that the orientation of the long dimension of each module 10 may be running either up and down the roof or side to side along the roof Non-rectangular arrays 100 may also have skirts 209 along various portions of the perimeter.

By enabling this method of installation, both the time and number of people required to install modules 10 in the first row of an array 100 may be substantially reduced. Further advantages of using a skirt 209 as a jig may include enabling a method for installers to install the first row of modules 10 in an array 100 from a location that is a safe distance from a rooftop or other surface's edge. An additional advantage may be the ability to mount modules all the way to a rooftop or other surface's edge without the need for installers to be on ladders and/or scaffolding. This benefit may result from the provision of interlock 6 which may couple skirts 209 together in addition to coupling modules 10 together via a pivot-fit, drop-in type of mounting as described earlier. The combination of simplified first row module installation and increased installer safety may result in reduced overall installation time and therefore reduce total system installation cost.

Array skirts may also be automatically bonded (for electrical grounding purposes) to PV module frame 2 through the use of interlocks 6 comprising couplings with grounding features that provide a ground bond path between skirts 209 (and other skirt embodiments disclosed in this specification) and PV module frame groove features 3. The bonding in this case is automatic since mechanical connection of interlock 6 to skirt 209 automatically cuts a ground path in the material, possibly eliminating the need to run separate grounding wires to the devices. Thus, the automatic grounding feature skirt 209 enables may further reduce total system installation time, as well as material costs.

FIG. 13A shows the same array depicted in FIG. 1 except further comprising array skirt 213 installed on all four sides of the array. FIG. 13B is a detail view area in circle of FIG. 13A. In order to allow for enhanced power output of the modules 10 within array 100, skirt 213 may comprise louvers 79 to permit dissipation of heat from beneath the array. These louvers 79 may be added to a skirt 213 through common stamping or other low cost manufacturing methods. Also disclosed in FIGS. 13A and 13B is a snap-in module gap screen 712 that may prevent entry of organic debris, rodents, burning embers, etc. As further disclosed below, this screen may be installed using module gap spring clips containing male features or tabs that interface with the frame groove 3 located on adjacent module frames in order to secure module gap screen 712 in place.

FIG. 14A shows a PV array 100 with skirt 214 mounted on the front and side screens 214S mounted on the remaining sides of the array. FIG. 14B is a detail view area in circle of FIG. 14A The side screens 214S may mount to the frame groove 3 using fasteners, spring clips (shown in FIG. 14B detail view and further disclosed below), wedges, camming devices or other components containing geometrically compatible male features. In other embodiments side screens 214S mount to the side or top of frames 2. Side screens 214S may comprise a perforated screen portion as shown or louvers or variously sized and space holes.

Figure 15:
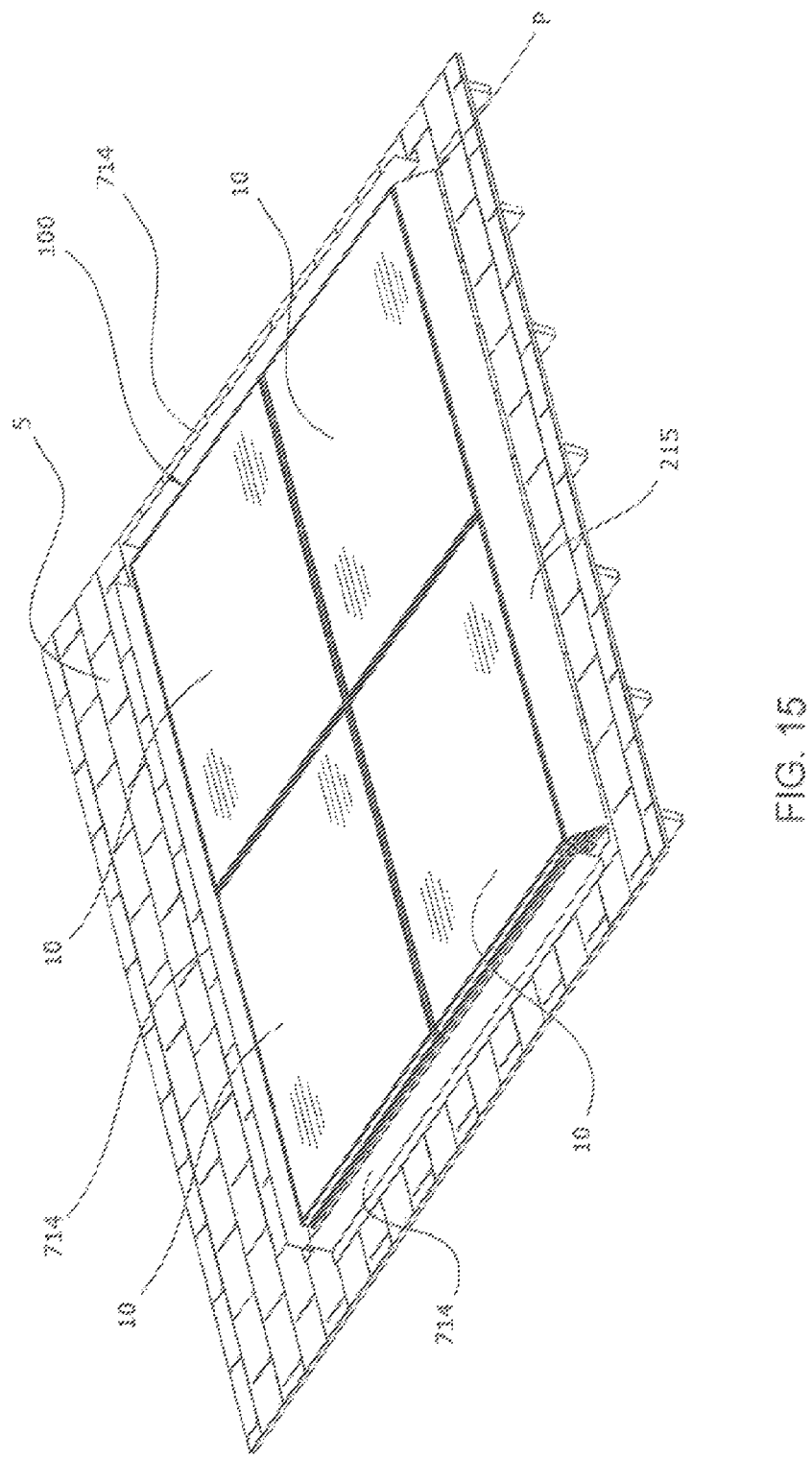
FIG. 15 shows a PV array with skirt mounted on the front side and fire barrier walls installed directly to a roof surface on the other sides of the array.

FIG. 15 shows a PV array 100 with skirt 215 mounted on the front side and fire barrier walls 714 installed directly to roof surface 5 on the other sides of the array. One of skill in the art would recognize that fire barrier walls 714 may also be mounted to other surface types. These fire barrier walls 714 may be affixed to a roof surface 5 using fasteners, adhesives, etc. and may be placed at an optimal distance from an array 100 to prevent flames from entering the air gap beneath. The fire barrier walls 714 may also be used in conjunction with module gap screens 712 and array side screens 713 in order for organic debris and burning embers to be prevented from entering.

FIGS. 16-19 show an embodiment of skirt 216 with louvers 79. Skirt 216 may be manufactured from bent metal and may snap onto coupling 8 male features 8A or 8B via a spring clip portion 350. As shown in the profile view of FIG. 16, the shape of skirt 216 and louver features 79 is such that a traveling open flame coming into contact with the skirt outside surface 711 may roll over the skirt and an array 100 of modules 10 while not allowing flames into the air gap beneath the array. The airflow dynamics caused by the flame may create negative pressure that draws air out through louvers making it even more difficult for flames to spread beneath array 100. Skirt 216 may also effectively prevent organic debris from accumulating beneath array 100 by substantially reducing the accessible air gap. Embodiments of feet 7 may allow for vertical height adjustment and connect directly to PV modules 10 therefore allowing for adjustment of the height of skirt 216 above a surface such as roof 5, thus ensuring that the proximity of the bottom of skirt 216 to a surface may be optimally positioned for preventing debris from entering the underlying air gap. The gap provided between surface 715 of skirt 216 and the outside frame surface 4 may be sized in order to enable adequate room for installing groove mounted wire clips, device mounting brackets, and other items.

As shown in FIGS. 20-21, some embodiments contemplate that skirt 221 further comprises pin 973 for rigidly coupling two skirts 221 together. Pin 973 may be a dowel pin, threaded fastener, press-fit pin or splice, and other device for rigidly coupling two skirts 221 together. FIG. 21 shows how skirt 221 may further comprise top surface 221A that is purposely raised above the top plane of array 100 such that air moving over skirt 221 may cause a Venturi effect that creates an updraft at the gap located between skirt 221 and PV module frame 2. This induced updraft may effectively enhance heat removal from beneath an array 100 and potentially reduce or eliminate the need for louvers or other means of ventilation while still providing the fire protection benefits enabled by a skirt, barrier wall or other form of block.

FIGS. 22-24 show an embodiment of a low cost single piece skirt 716 that may be attached directly to groove 3 located on the outside surface 4 of module frames 2. Male feature 717 of skirt 716 is geometrically compatible with the frame groove 3 and may rapidly install by a spring clip type connection that deforms the profile shape of the male feature 717 resulting in spring force being applied to the inside surfaces of the groove 3.

FIGS. 25-39 show alternate methods of attaching further embodiments of array skirts to the frame groove 3 by using various embodiments of frame groove engagement clips spaced at appropriate interval distances along the length of frame 2.

FIGS. 25-29 show a groove compatible spring clip 718 that may be inserted into frame groove 3 at appropriate interval distances along module frame 2. A low cost and easy to manufacture skirt 225 may then be installed to the spring clips 718 by inserting tabs 720A and 720B into slot features 721A and 721B.

FIGS. 30-33 show frame engagement clip 722 that may contain a ridged male feature 723 that may elastically deform frame groove 3 when inserted thus resulting in a spring induced clamping force that secures the clip in place. Rounded end features 724 located on clip 722 allow for compatible skirt insert section 230 to be attached before or after the clip 722 has been installed by elastically deforming spring section 230A of skirt 230.

FIGS. 34-39 show an additional embodiment of a frame groove compatible clip 727 in which male engagement feature 727A of a rotatable groove attachment clip 727 may be inserted laterally into the frame groove 3 at an approximate angle as shown. Once positioned within the groove at a desired location along the frame, the clip may then be rotated until substantially perpendicular with the top plane of module 10 to force engagement of male feature 727A with the slot 3A located with the female groove 3. Male feature upturned portions 727B of clip 727 may then be used to attach a compatible skirt section 234 using mounting slots 234A.

FIGS. 40-43 shows an additional frame groove compatible spring clip 732 for mounting screens 740 to the sides of a module 10 or array 100. Spring clip arm portions 733 may be used for affixing screen sections 740 once the spring clips are installed in appropriate locations in groove 3 along frame length 2. Alternatively, screen sections 740 may be affixed to the spring clip arm portions 733 prior to installation and mounted to the frame groove 3 as a preconfigured assembly.

FIGS. 44-47 show frame engagement clips 736 and 740 that may be inserted into the frame groove 3 at the corners and sides of modules 10, respectively. Both corner 736 and side 740 frame engagement clips may be used to install side screens 744 or various embodiments of skirts using capture features 738 and 739.

FIGS. 48-51 show an embodiment of a module gap spring clip 731 that may be used to install top screens 712 to protect against entry of organic material, rodents, burning embers, etc. at the gap between adjacent module frames. Spring tabs 732 insert into the frame groove 3 and contain hooked tips 733 that positively engage with upper slot 3A of the frame groove 3. The spring force enabled by the elastic deformation of the tabs during installation may assist in securing the screen against forces imposed by nature such as snow, ice or wind. Additional embodiments of the spring clip design may contain shaped features at the top end of the clip that prevent over insertion during installation into the module gap and may also further aid in resisting down forces imposed due to snow, ice and wind.

FIGS. 52-55 show an extrusion span jig 800 for aligning modules 10 and enabling rapid installation. Extrusion span jig 800 may contain features 734 that allow for a low cost skirt section 252 to be installed at the front of the array. Extrusion span jig 800 may contain a groove 301 that may be installed onto geometrically compatible male features 8A or 8B located on the coupling portion 8 of feet 7.

FIGS. 56-57 show a rooftop surface 5 with height adjustable mounting feet 7 installed in predetermined locations and an extrusion span jig 800 installed onto the mounting feet 7.

FIGS. 58-59 show a first row of modules 10 installed on the mounting feet 7 aligned with extrusion span jig 800 and an installed array 100 with the skirt section 258 attached to the extrusion span jig 800.

FIGS. 60-63 show skirt embodiment 260 comprising louvers 79 located along the top of portion 260A of skirt 260. A separate flexible screen material 370 may be attached to the bottom of the skirt using common fasteners.

In embodiments skirt and screen elements disclosed above may be constructed of flexible materials that may conform to surface variations on the roof, thus providing an effective barrier.

FIG. 64A shows a skirt embodiment 264 comprising a scalloped lower portion that conforms to a shape of a curved tile roof 305. FIG. 64B is a detail view of area in circle of FIG. 64A.

FIG. 65 disclose the manner in which the wedging fit of an anti-rotation component 11 may prevent interlock 6 from disengaging from within a module frame groove 3 due to rotation caused by downward module deflection created by heavy loading due to imposed forces from snow, ice or wind. This disengagement may once again be prevented by forcing a surface 13 of the anti-rotation component 11 in direct contact with a surface of a module frame 15.

FIG. 66 shows an accessory component assembly 600 that may be used to mount electrical boxes 500 of various types to groove 3. As FIG. 66 shows, anti-rotation components 11 may also be inserted into apertures 412 located within the accessory component assembly 600 in order to prevent rotational movement of the assembly after it has been installed.

The prevention of rotational and translational movement of novel photovoltaic module mounting system components, tools and accessories through the use of the anti-rotation component 11, may enable enhanced safety and cost savings for various groove mounted components by preventing their accidental removal during installation or during regular O&M. In addition, the use of the anti-rotation components 1 may result in increased useful lifetime of various frame groove mounted products and photovoltaic modules by reducing wind induced vibration, increasing snow load capabilities for modules and preventing accidental removal and breakage of components.

Anti-rotation component 11 may be held within a hole or slot via a press-fit action, a tooth and barb connection, screw threads, other typical mechanical connections, or simply by gravity. In one aspect anti-rotation component is novel because the direction of insertion may be opposing the rotational force that it is resisting. For example, skirt 20 as shown in FIG. 3 must rotated counterclockwise to be removed, thereby imparting an approximately horizontal force on anti-rotation component 11. Yet anti-rotation component 11 is inserted in a mostly vertical direction as shown by the arrow. Thus, the counterclockwise rotational force does not tend to push the anti-rotation component 11 back out, thereby allowing anti-rotation component to include a method of retention that allows easy installation by hand or lightweight tools.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions, and sub-combinations as are within their true spirit and scope.

What is claimed as invention is:

1. A skirt system comprising:
   a first skirt;
   a second skirt;
   a first photovoltaic module;
   a second photovoltaic module;
   a leveling foot; and
   an interlock;
   wherein said interlock couples said first photovoltaic module to said first skirt, said second photovoltaic module to said second skirt, and said first skirt to said second skirt, such that said skirts are coupled together end-to-end, and wherein said leveling foot couples said skirt system to a roof surface.

2. The system of claim 1 wherein said leveling foot enables said first and second photovoltaic modules to be height-adjustable with respect to the roof surface.

3. A system comprising:
   a two-sided coupler having a first side adapted to connect to a frame of at least one photovoltaic module, and a second side adapted to connect to a section of array skirt with spacing in between;
   a section of array skirt, having an outward facing, angled skirt portion for blocking visibility to at least a portion of the underside of an installed photovoltaic array, and an inward facing portion for connecting the section of array skirt to the second side of the two-sided coupler; and
   a base portion supporting the two-sided coupler, wherein a spacing between the base portion and the two-sided coupler is adjustable, thereby adjusting a height of the at least one photovoltaic module and section of array skirt with respect to a roof surface simultaneously.

4. The system according to claim 3, wherein the spacing between the base portion and the two-sided coupler is adjustable after the at least one photovoltaic module and section of array skirt have been attached to the two-sided coupler.

5. The system according to claim 3, wherein the two-sided coupler connects to the section of array skirt so that a top portion of the array skirt is held higher than a top surface of an attached photovoltaic module thereby creating a Venturi effect at the spacing between the array skirt and the photovoltaic module.

6. The system of claim 1 further comprising at least one anti-rotation component preventing rotation of the first and second skirts with respect to the leveling foot.

7. The system according to claim 3, further comprising an anti-rotation component adapted to prevent rotation of the section of array skirt with respect to the two-sided coupler.

\* \* \* \* \*

UNITED STATES PATENT AND TRADEMARK OFFICE
CERTIFICATE OF CORRECTION

| | |
|---|---|
| PATENT NO. | : 9,291,369 B2 |
| APPLICATION NO. | : 13/316450 |
| DATED | : March 22, 2016 |
| INVENTOR(S) | : John Raymond West et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 40 days.

Signed and Sealed this
Twenty-sixth Day of July, 2016

Michelle K. Lee
*Director of the United States Patent and Trademark Office*